US012797285B2

(12) United States Patent
Ratner et al.

(10) Patent No.: US 12,797,285 B2
(45) Date of Patent: Nov. 17, 2026

(54) MOBILITY DEVICE

(71) Applicants: The United States Government as represented by the Department of Veterans Affairs, Washington, DC (US); REGENTS OF THE UNIVERSITY OF MINNESOTA, Minneapolis, MN (US)

(72) Inventors: Edward R. Ratner, Minneapolis, MN (US); Gary D. Goldish, Plymouth, MN (US); Steve M. Morin, Minneapolis, MN (US); Jared Bliss, Minneapolis, MN (US)

(73) Assignees: United States Government as represented by the Department of Veterans Affairs, Washington, DC (US); Regents of the University of Minnesota, Minneapolis, MN (US)

( * ) Notice: Subject to any disclaimer, the term of this patent is extended or adjusted under 35 U.S.C. 154(b) by 247 days.

(21) Appl. No.: 18/702,057

(22) PCT Filed: Oct. 18, 2022

(86) PCT No.: PCT/US2022/046993

§ 371 (c)(1),
(2) Date: Apr. 17, 2024

(87) PCT Pub. No.: WO2023/069414

PCT Pub. Date: Apr. 27, 2023

(65) Prior Publication Data

US 2024/0409176 A1 Dec. 12, 2024

Related U.S. Application Data

(60) Provisional application No. 63/330,115, filed on Apr. 12, 2022, provisional application No. 63/257,000, filed on Oct. 18, 2021.

(51) Int. Cl.
*A61H 3/04* (2006.01)
*B62K 5/007* (2013.01)
*B62K 5/025* (2013.01)

(52) U.S. Cl.
CPC ............... *A61H 3/04* (2013.01); *B62K 5/007* (2013.01); *B62K 5/025* (2013.01);
(Continued)

(58) Field of Classification Search
CPC ........... A61H 3/04; B62K 5/007; B62K 5/025
See application file for complete search history.

(56) References Cited

U.S. PATENT DOCUMENTS 10,327,976 B1 * 6/2019 Boushehri ................ A61H 3/04
2014/0265211 A1 * 9/2014 Hansen .................. A61G 5/026
280/250

(Continued)

FOREIGN PATENT DOCUMENTS

WO WO-2020060422 A1 * 3/2020 ............... A61H 3/04

*Primary Examiner* — Alexander K Garlen
(74) *Attorney, Agent, or Firm* — Ballard Spahr LLP

(57) ABSTRACT

A mobility device can have a frame, a pair of rear wheels, and one or more casters. The mobility device can further comprise a stem having handlebars at a first end and a front wheel at a second end. The stem can be selectively positioned relative to the frame between a first position, in which the front wheel and the rear wheels engage the ground, and a second position, in which the rear wheel and the caster(s) engage the ground.

24 Claims, 28 Drawing Sheets

(52) U.S. Cl.
CPC .. *A61H 2003/043* (2013.01); *A61H 2003/046* (2013.01); *A61H 2201/0192* (2013.01); *A61H 2201/1207* (2013.01); *A61H 2201/1635* (2013.01); *A61H 2201/1673* (2013.01); *A61H 2201/1676* (2013.01)

(56) References Cited

U.S. PATENT DOCUMENTS

| | | | | |
|---|---|---|---|---|
| 2015/0084307 | A1* | 3/2015 | Goldish | A61G 5/10<br>280/250 |
| 2016/0151215 | A1* | 6/2016 | Golden, Jr. | A61G 5/104<br>280/304.1 |
| 2017/0007477 | A1* | 1/2017 | Hansen | A61G 5/026 |
| 2021/0282986 | A1* | 9/2021 | Goldish | A61G 5/047 |
| 2022/0280360 | A1* | 9/2022 | Hansen | A61G 5/023 |

* cited by examiner

MOBILITY DEVICE

CROSS REFERENCE TO RELATED APPLICATIONS

This application is a national phase filing under 35 U.S.C. § 371 of International Application No. PCT/US2022/046993, filed Oct. 18, 2022, which claims the benefit of the filing dates of U.S. Provisional Patent Application Nos. 63/257,000, filed Oct. 18, 2021, and 63/330,115, filed Apr. 12, 2022, the entirety of each of which is hereby incorporated by reference herein.

BACKGROUND

Many people can walk only short distances or slowly, limiting their independent activities. Two-, three-, and four-wheeled manual walkers can improve stability when walking but do not improve speed or endurance. Bicycles require balance and cannot be used indoors. Electric seated scooters and power wheelchairs require the user to sit and are relatively difficulty to transport in a vehicle. Two-wheeled electric kick scooters are not easy to push manually and require good balance to ride to avoid falls and injury. Accordingly, it is desirable to provide a mobility device that overcomes one or more of the shortcomings of conventional mobility devices.

SUMMARY

Disclosed herein is a mobility device having a longitudinal axis. The mobility device can comprise a frame. A pair of rear wheels can be coupled to the frame. The rear wheels can be spaced along a transverse axis that is perpendicular to the longitudinal axis. At least one caster can be coupled to the frame. The at least one caster can be positioned forwardly of the pair of rear wheels along the longitudinal axis. A stem can be coupled to the frame. The stem can have a first end and a second end. The stem can be configured to be selectively positioned in at least a first position and a second position. The second position can be rotationally offset from the first position about a rotational axis. At least one handle bar can be coupled to the stem at the first end of the stem. At least one front wheel can be coupled to the second end of the stem. A lowest portion of the pair of rear wheels and a lowest portion of the at least one caster can define a plane. When the stem is in the first position, a lowest portion of the at least one front wheel can be below the plane. When the stem is in the second position, the lowest portion of the at least one front wheel can be above the plane.

DESCRIPTION OF THE DRAWINGS

These and other features of the preferred embodiments of the invention will become more apparent in the detailed description in which reference is made to the appended drawings wherein.

DETAILED DESCRIPTION

Figure 1:
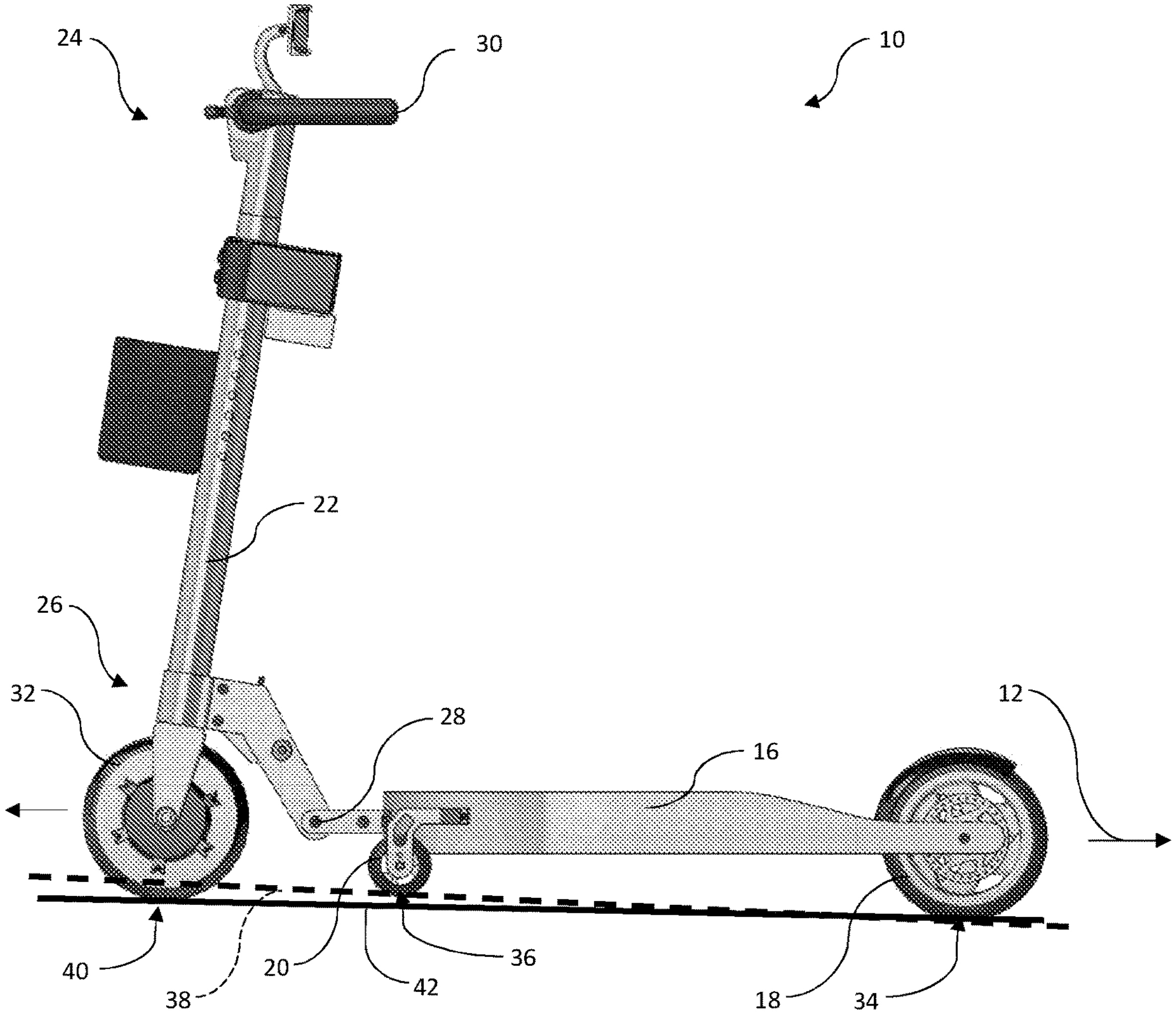
FIG. 1 is a side view of an exemplary mobility device in a scooter configuration.

The present disclosure can be understood more readily by reference to the following detailed description of the invention, the figures and the examples included herein.

Before the present systems, devices, and methods are disclosed and described, it is to be understood that they are not limited to specific synthetic methods unless otherwise specified, or to particular reagents unless otherwise specified, as such may, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including matters of logic with respect to arrangement of steps or operational flow, plain meaning derived from grammatical organization or punctuation, and the number or type of aspects described in the specification.

All publications mentioned herein (including those within the provided reference lists) are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention.

Further, the dates of publication provided herein can be different from the actual publication dates, which can require independent confirmation.

As used in the specification and the appended claims, the singular forms "a," "an," and "the" include plural referents unless the context clearly dictates otherwise. Thus, for example, reference to "a front wheel" refers to one or more such front wheels.

The word "or" as used herein means any one member of a particular list and, except where otherwise indicated, can also include any combination of members of that list.

Throughout the description and claims of this specification, the word "comprise" and variations of the word, such as "comprising" and "comprises," means "including but not limited to," and is not intended to exclude, for example, other additives, components, integers or steps. In particular, in methods stated as comprising one or more steps or operations it is specifically contemplated that each step comprises what is listed (unless that step includes a limiting term such as "consisting of"), meaning that each step is not intended to exclude, for example, other additives, components, integers or steps that are not listed in the step.

Ranges can be expressed herein as from "about" or "approximately" one particular value, and/or to "about" or "approximately" another particular value. When such a range is expressed, a further aspect includes from the one particular value and/or to the other particular value. Similarly, when values are expressed as approximations, by use of the antecedent "about" or "approximately," it will be understood that the particular value forms a further aspect. It will be further understood that the endpoints of each of the ranges are significant both in relation to the other endpoint and independently of the other endpoint. It is also understood that there are a number of values disclosed herein and that each value is also herein disclosed as "about" that particular value in addition to the value itself. For example, if the value "10" is disclosed, then "about 10" is also disclosed. It is also understood that each unit between two particular units is also disclosed. For example, if 10 and 15 are disclosed, then 11, 12, 13, and 14 are also disclosed.

As used herein, the terms "optional" or "optionally" mean that the subsequently described event or circumstance may or may not occur and that the description includes instances where said event or circumstance occurs and instances where it does not.

Optionally, in some aspects, when values are approximated by use of the antecedents "about," "substantially," "approximately," or "generally," it is contemplated that values within up to 15%, up to 10%, up to 5%, or up to 1% (above or below) of the particularly stated value or characteristic can be included within the scope of those aspects.

Disclosed herein, in various aspects, is a mobility device. The mobility device can be easily pushed by a user, can enable electrically powered mobility in standing or seated positions, and can provide stability in both manual and powered modes. Unlike conventional mobility devices, the disclosed mobility device can combine stability (hard to tip) and transportability (light weight and compact size when folded), and, in optional aspects, can provide standing or sitting positions.

Referring to FIG. 1-4, a mobility device 10 having a longitudinal axis 12 can comprise a frame 16. A pair of rear wheels 18 can be coupled to the frame 16. The rear wheels 18 can be spaced along a transverse axis 14 that is perpendicular to the longitudinal axis 12. One or more casters 20 can be coupled to the frame 16. The one or more casters 20 can be positioned forwardly of the pair of rear wheels 18 along the longitudinal axis 12. In exemplary aspects, mobility device 10 can comprise two casters 20 that are positioned on opposing sides of the frame 16 and spaced along the transverse axis 14. The casters 20 can be configured to swivel about respective vertical axes. In some optional aspects, the frame 16 can comprise aluminum (e.g., aluminum tubing).

A stem 22 can be coupled to the frame 16. The stem 22 can have a first end portion 24 and a second end portion 26. The stem 22 can be configured to be selectively positioned in at least a first position (FIG. 1) and a second position (FIG. 3), wherein the second position is rotationally offset from the first position about a rotational axis 28. At least one handlebar 30 can be coupled to the stem 22 at the first end portion 24 of the stem. A front wheel 32 (or front wheels) can be coupled to the second end portion 26 of the stem 22.

A respective lowest portion 34 of the pair of rear wheels 18 and a lowest portion 36 of each caster define (are coplanar within) a plane 38. When the stem 22 is in the first position, a lowest portion 40 of the front wheel 32 can be below the plane 38. When the stem 22 is in the second position, the lowest portion 40 of the front wheel 32 can be above the plane 38. Accordingly, the stem 22 can be positioned relative to the frame 16 to selectively engage the front wheel 32 with, or disengage the front wheel from, a ground or floor surface 42. That is, with the stem 22 in the first position, the front wheel 32 and the rear wheels 18 engage the ground or floor surface 42 in a scooter configuration. When the stem 22 is in the second position, the front wheel 32 is lifted so that the rear wheels 18 and caster(s) 20 engage the ground or floor surface 42 in a walker configuration.

Figure 27:
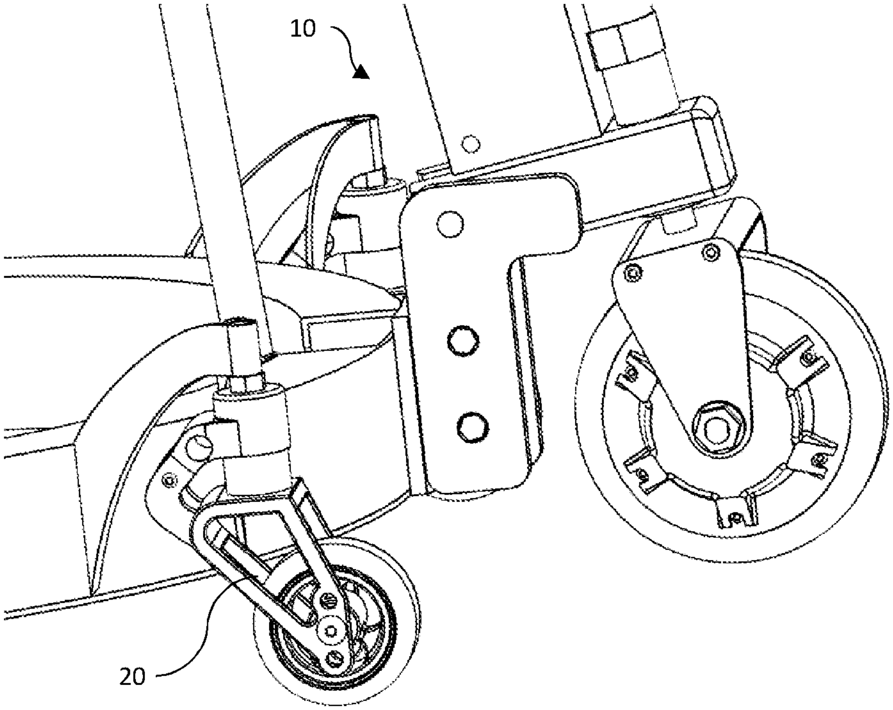
FIG. 27 is a partial perspective view of the exemplary mobility device of FIG. 25.

With the mobility device 10 in the scooter configuration, the casters 20 can serve as anti-tip elements. Optionally, the casters(s) 20 can comprise shock-absorbing caster forks, as shown in FIG. 27. In some exemplary aspects, the caster(s) 20 can comprise FROG LEGS suspension forks, which can optionally be provided as components of a FROG LEGS suspension system, including wheels, treads, bearings, and/or shields.

In some aspects, the mobility device 10 can comprise a deck 44. For example, the deck 44 can be defined by at least a portion of the frame 16. In some aspects, the deck 44 can be coupled to the frame 16. For example, in some aspects, the frame 16 can comprise a support 46 (e.g., a U-shaped support). The support 46 (e.g., U-shaped support) can comprise opposing side portions 48 that extend along the longitudinal axis 12. In some aspects, the deck 44 can couple to and extend between the opposing side portions 48 of the support 46.

Figure 12:
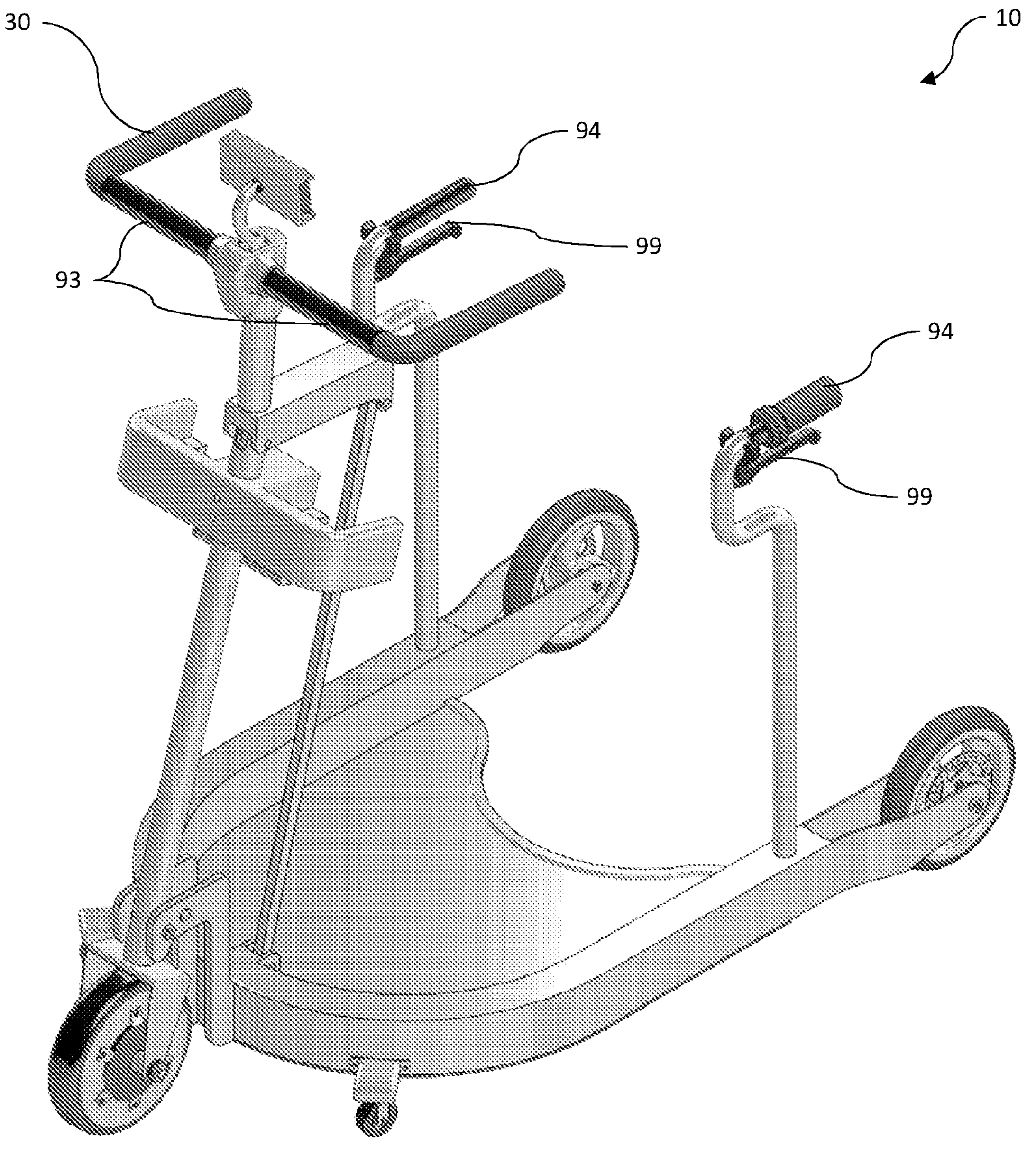
FIG. 12 is a side view of the mobility device of FIG. 9 in the scooter configuration.

Referring to FIG. 12, in some aspects, the deck 44 can define a rear edge 50. The rear edge 50 can have opposed side portions 52 and a center portion 54 that is positioned between the side portions 52 along the transverse axis 14. The center portion 54 of the rear edge 50 can be spaced from the side portions 52 of the rear edge 50 in a forward direction along the longitudinal axis 12. In this way, the deck 44 can provide standing portions on the sides while allowing a user to walk behind the mobility device 10 in the walker configuration without inadvertently stepping on or contacting the rear edge 50 of the deck. As shown, in various optional aspects, the center portion 54 and side portions 52 of the rear edge 50 can be portions of a continuous curved edge, rather than discrete segments.

Figure 23A:
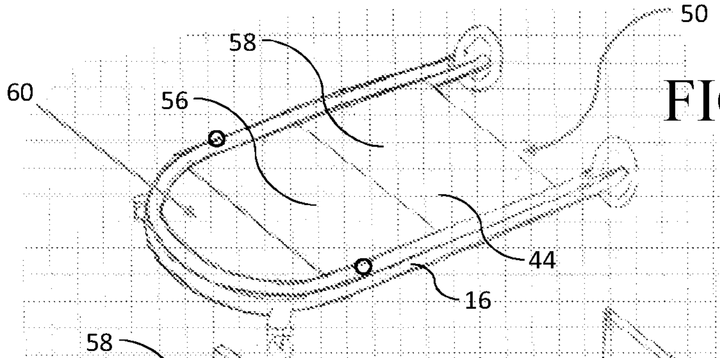
FIG. 23A is a perspective view of a frame and a deck of a mobility device. As shown, the deck can include pivotable segments, and the pivotable segments can be positioned in a first configuration.
Figure 23B:
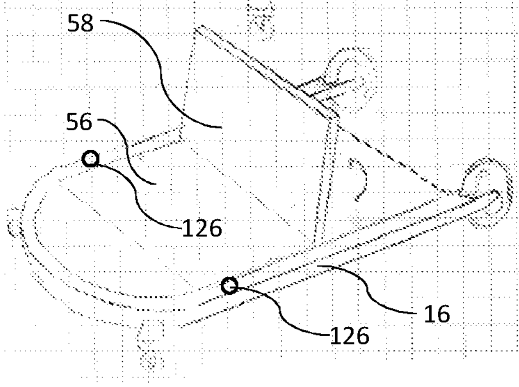
FIG. 23B is a perspective view of the deck of FIG. 23A, with the pivotable segments in a partially collapsed configuration.
Figure 23C:
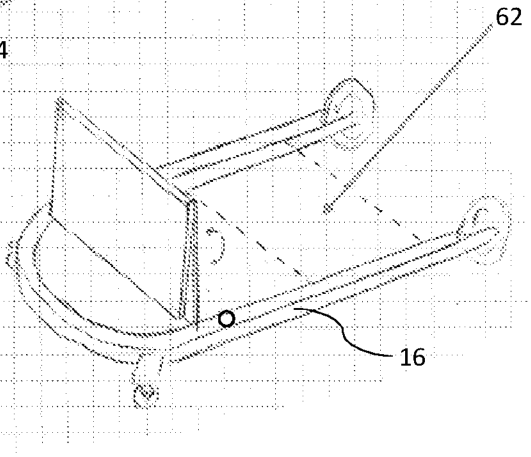
FIG. 23C is a perspective view of the deck of FIG. 23A, with the pivotable segments in a fully collapsed configuration.

Referring to FIGS. 23A-C, in some optional aspects, the deck 44 can be collapsible in order to position the deck away from the feet of the user when the mobility device 10 is being used in the walker configuration. For example, at least a portion of the deck 44 can be configured to move relative to the frame from a use configuration to a stowed configuration. In some optional aspects, the deck 44 can comprise a first segment 56 that is pivotably coupled to the frame 16. In further optional aspects, the deck 44 can comprise a second segment 58 that is pivotably coupled to the first segment 56. In further aspects, the deck 44 can comprise one or more segments 60 that are fixedly coupled (e.g., welded) to the frame 16. Said segment(s) 60 can provide stability to the frame and deck. The pivotable segments (e.g., the first and second segments 56, 58) can be pivoted about and between a stowed configuration (FIG. 23C) and a use configuration (FIG. 23A). In the stowed configuration, the deck 44 can be moved to provide an open space 62 between opposing sides of the frame 16 for a user to step into. In providing this open space, the handlebars 30 need not extend as far rearwardly to be gripped and used in the walker configuration. In some optional aspects, the deck 44 can be held in the use configuration by one or more retainers (e.g., snaps, locks, etc.). As should be understood, the deck 44 can be collapsed to provide an open space 62 using other structures including, but not limited to, an accordion structure or a track upon which a portion of the deck slides. Optionally, at least a portion of the deck 44 can be configured to extend rearwardly of the frame 16. The deck 44 can have an adjustable length. For example, the deck 44 can be elongated in order to receive cargo. In exemplary aspects, at least one panel/segment can be moved to an extension position in order to provide extra deck space for standing (e.g., for two users to use in tandem) or for cargo space.

The mobility device 10 can further comprise a motor 64 that is operatively coupled to at least one of the front wheels 32 or one or both of the rear wheels 18. For example, in some aspects, the motor 64 can be operatively coupled to the front wheel. Thus, when the stem 22 is in the second configuration, with the mobility device 10 in the walker configuration, the motor 64 can be disengaged from the ground to prevent the motor from resisting rolling movement. In further aspects, the motor 64 can be operatively coupled to the rear wheels 18. In these aspects, the motor can be used both in the scooter configuration and in the walker configuration to assist walking (e.g. to reduce effort to push the device up an incline). Optionally, the motor 64 can be a wheel hub motor. The wheel hub motor can be integral to the front wheel. However, it is contemplated that the wheel hum motor can be secured or coupled to the front wheel using any suitable mechanism. In exemplary, optional aspects, the motor can be embedded in the front wheel 32 as a Brushless Wheel Hub Motor. As an example, the motor can be embedded in the front wheel 32 as a 36V, 350 W Brushless Wheel Hub Motor with an 8-inch (20.32 cm) diameter.

Figure 24:
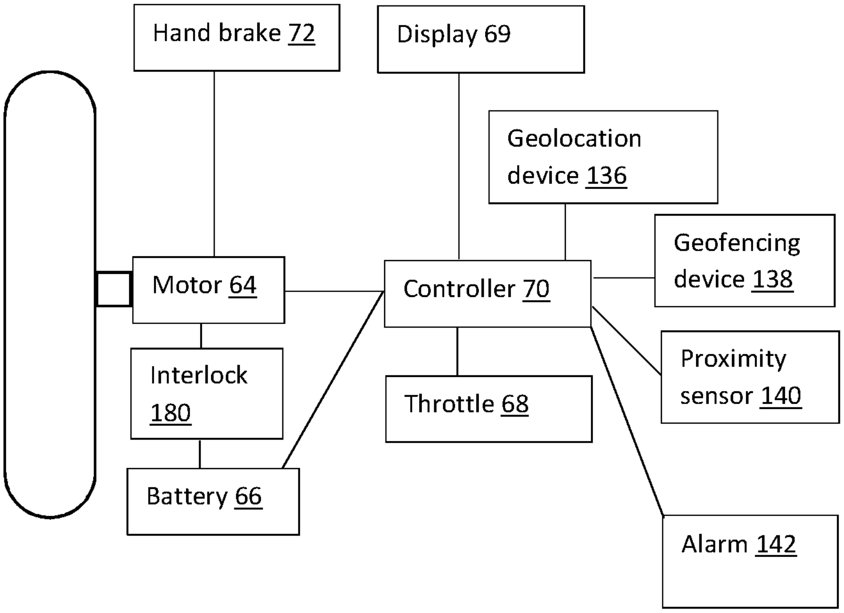
FIG. 24 is a schematic diagram of an electronic system of the mobility device as disclosed herein.

As shown in FIG. 24, the motor 64 can be in electrical communication with a battery 66. In some aspects, the battery 66 can be provided as a battery pack. Optionally, the battery pack can be configured for removal and replacement. For example, a quick-release can enable the battery pack to be removed for replacement. For example, the quick-release can comprise a detent that can secure the battery pack in place, and the detent can be disengaged to decouple the battery pack from the mobility device. In this way, the battery can be smaller, lighter, and/or less expensive, while permitting a user to carry extra charged battery packs for longer distance travel. In further aspects, the battery 66 can be charged while coupled to the mobility device via a charging cable or other conventional methods. Optionally, the battery can be a 40V capability with a 3.0 Ah/120 Wh, 12.5 mm×8.3 mm×7.6 mm. In exemplary aspects, the battery can provide a range per full charge of at least 10 km, at least 15 km, at least 16 km, or more.

The mobility device 10 can comprise a throttle 68 in communication with the motor 64. Optionally, the throttle 68 can be, for example, a thumb throttle that can be angularly displaced from a neutral position to select a throttle amount. The thumb throttle can be coupled to the handlebars or otherwise positioned adjacent the handlebars so that a user gripping the handlebars can actuate the thumb throttle while gripping the handlebars. The thumb throttle can be a continuously adjustable accelerator. The throttle 68 can be directly coupled to the motor 64 or indirectly coupled to the motor by a controller 70. For example, the controller 70 can be configured to determine speed and control power delivered to the motor 64 based on the speed of the motor.

The mobility device 10 can optionally comprise a display 69. Optionally, the display 69 can couple to the stem via an adjustable mount (e.g., vertically adjustable mount) in order to position the display 69 for easy viewing. The display 69 can be in communication with the controller 70. In various aspects, the display 69 can be configured to display one or more of a time, a speed of the mobility device, or a battery charge level and/or remaining battery life. The display 69 can further be configured to receive one or more inputs. For example, the display 69 can comprise one or more push buttons and/or a touchscreen. For example, in exemplary, optional aspects, the display 69 can be configured to receive a maximum speed selection from a user. In further aspects, the display 69 can comprise a plurality of electronic devices. In exemplary aspects, the display can comprise a first display device (e.g., a digital display device) that is configured to display the speed of the mobility device and the time. Optionally, the first display can comprise a GPS device. The display can further comprise a second display device (e.g., a digital display device) that is configured to display a remaining charge on the battery.

In some aspects, a maximum power of the motor 64 and/or the controller 70 can limit speed of the mobility device 10 on level surfaces to 3-4 miles per hour (walking speed). In another embodiment, the battery, motor and the controller can enable speeds up to 15-20 miles per hour (e.g., cycling speed). In yet another aspect, the controller 70 can allow the maximum speed to be set at a desired level (e.g., one of a plurality of predetermined levels, such as, for example, levels associated with an indoor mode and an outdoor mode). In some aspects, the controller 70 can be configured for measuring/limiting the energy supplied to the motor. Additionally or alternatively, the controller 70 can be configured to measure and limit the speed (RPM) of the powered wheel(s). In these aspects, the controller 70 can be configured to limit the speed of the mobility device 10 going downhill even without motor-powered velocity. Optionally, the controller 70 can require a minimum movement speed (e.g., 3 kilometers per hour) to engage the motor. In further aspects, no minimum movement speed is required to engage the motor.

The mobility device 10 can comprise at least one hand brake 72 that is in communication with at least one wheel of the pair of rear wheels 18. For example, the mobility device 10 can comprise a pair of hand brakes 72, with a respective hand brake on opposing sides of the at least one handlebar. The hand brake(s) 72 can actuate, for example, a mechanical brake (e.g., a friction pad that engages a wheel or a disc that is coupled to the wheel) and/or an electric brake. Optionally, the electric brake can enable regenerative charging. For example, actuation of the electric brake can cause the motor 64 to run in reverse to generate power. Optionally, an inverter and/or AC-to-DC converter can be used prepare the generated power for storage in the battery.

In some aspects, the at least one handlebar 30 can comprise a single handlebar that extends between opposing sides of the stem 22 (along the transverse axis). In further aspects, the at least one handlebar 30 can comprise separate handlebars on each side of the stem 22.

The handlebars 30 comprises a transverse portion 90 that extends radially from the stem 22 and a distal end portion 92 that extends at a predetermined angle from the transverse portion. The distal end portion 92 can extend along the longitudinal axis 12 (optionally, parallel or generally parallel to the longitudinal axis 12). The distal end portions 92 can be particularly advantageously used in the walker configuration.

Figure 7:
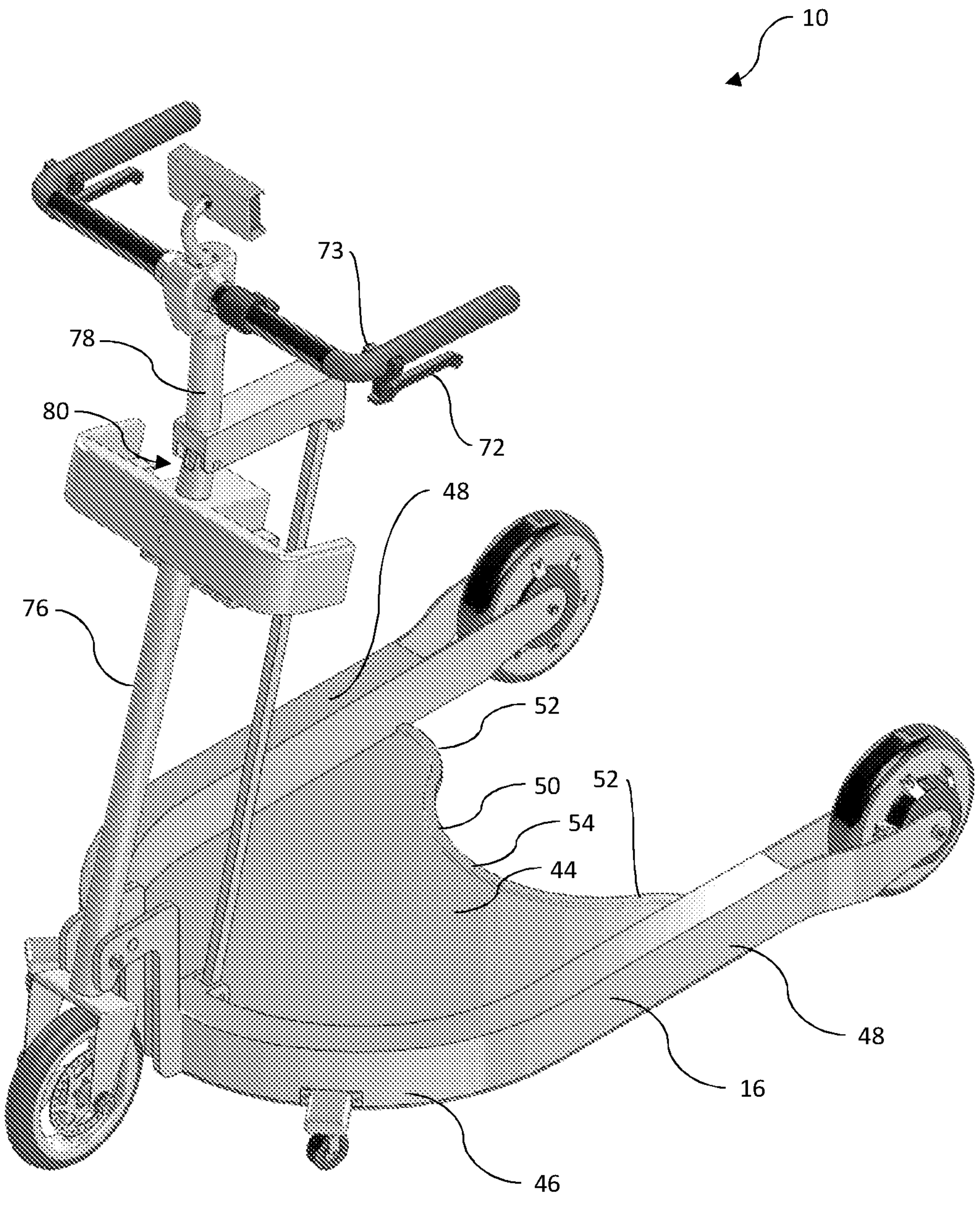
FIG. 7 is a perspective view of another exemplary mobility device in a scooter configuration.

In exemplary aspects, the hand brake 72 can be positioned for use when gripping the transverse portion(s) 90. In further aspects, the hand brake 72 can be positioned for use when gripping the distal end portions 92. In yet further aspects, the hand brakes 72 can be removably coupled to the handlebars (for example, via clips 73 (FIG. 7)) so that they can be repositioned in a desired use position.

Referring to FIGS. 7-10, in some aspects, the mobility device 10 can comprise a four-bar linkage 74. The stem 22 can comprise a lower portion 76 that defines a portion of the four-bar linkage, an upper portion 78, and a universal joint 80 that couples the upper portion of the stem to the lower portion of the stem. The four bar linkage 74 can further comprise a first bar 82 that is pivotably coupled to the frame at a first pivot point 84 and a second bar 86 that is pivotably coupled to the first bar 82 at a second pivot point 88. The second bar 86 can be coupled to the stem 22. The upper portion 78 of the stem 22 can extend from the second bar 86 at a fixed angle. In this way, as the stem 22 pivots between the first and second positions, the handlebars 30 remain rotationally fixed. This can be particularly advantageous for maintaining the distal end portions 92 of the handlebars 30 in a generally horizontal position in both the walker configuration and the scooter configuration.

In further aspects, and with reference to FIGS. 1-4, the handlebars can be pivoted relative to the stem 22 and locked in a plurality of pivoted positions relative to the stem in order to maintain the handlebars in a desired orientation (e.g., with the distal end portions 72 of the handlebars 30 in a generally horizontal position in both the walker configuration and the scooter configuration).

Figure 25:
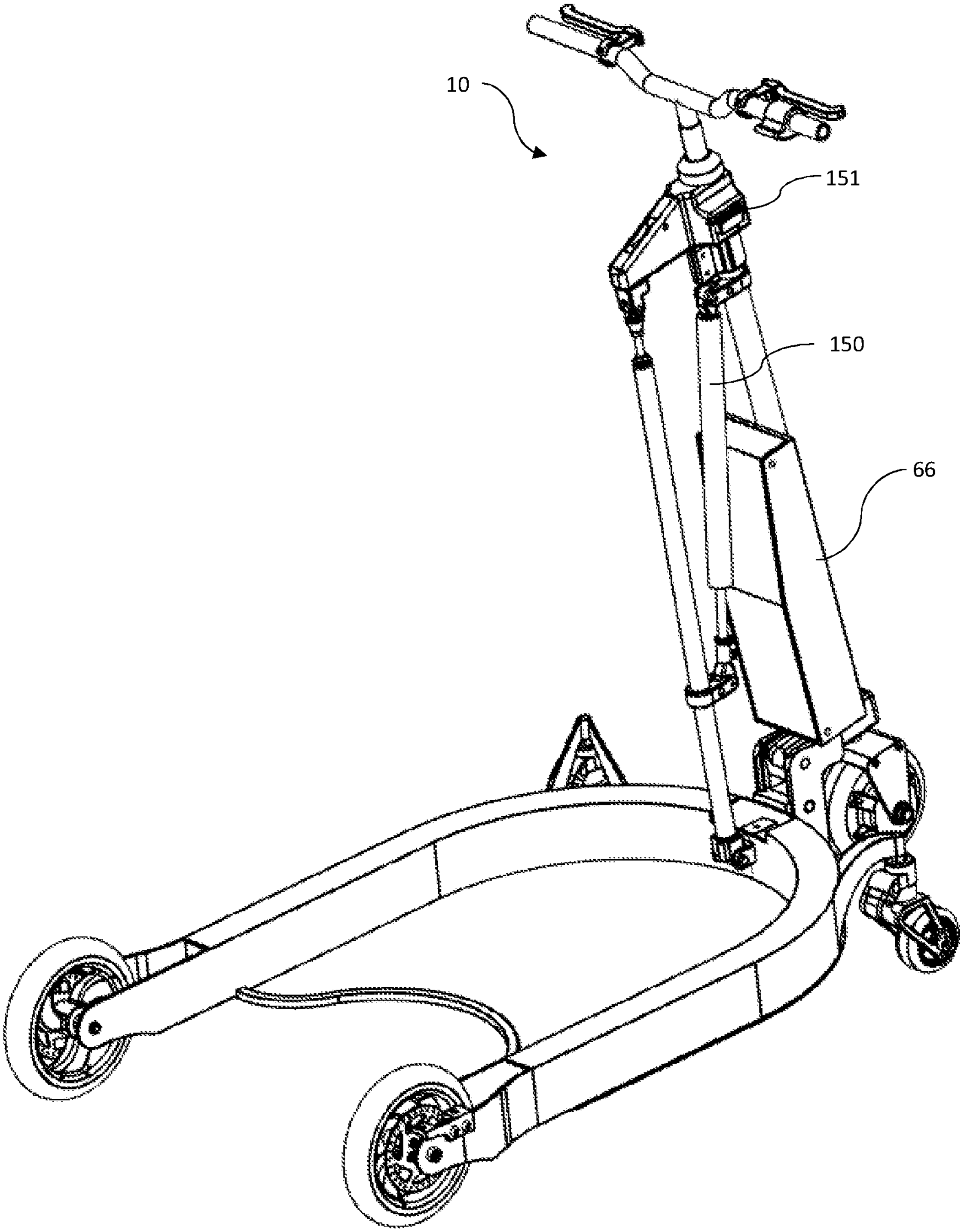
FIG. 25 is a perspective view of an exemplary mobility device as disclosed herein.
Figure 26:
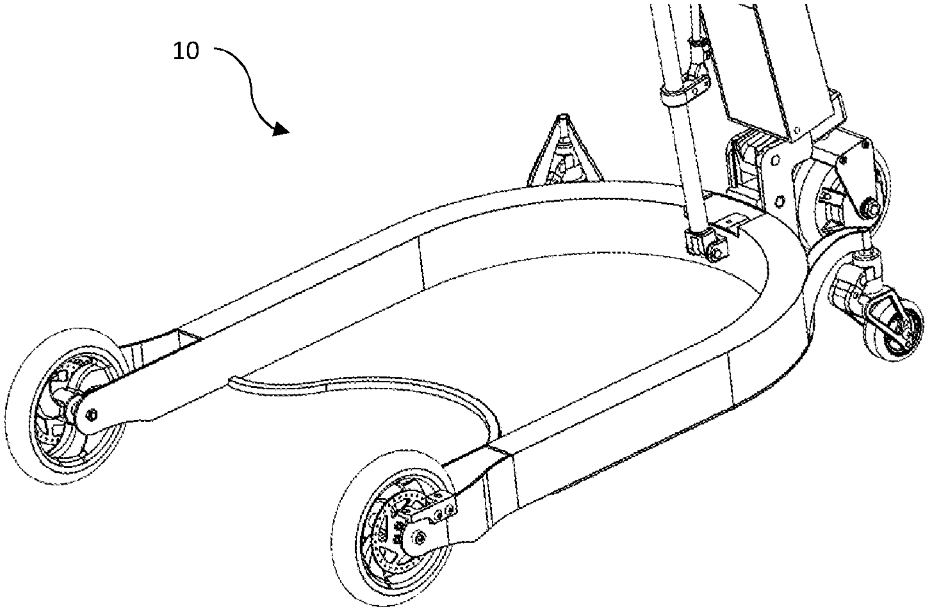
FIG. 26 is a partial perspective view of the exemplary mobility device of FIG. 25.

The mobility device 10 can comprise a locking mechanism for fixing the rotational position of the stem 22 relative to the frame 16 about the rotational axis 28. For example, referring to FIG. 22, in some optional aspects, a gas strut 150 can extend between the lower portion 76 of the stem 22 and the first bar 82. The gas strut 150 can be in fluid communication with a remote valve release 151 (FIG. 25) and can be configured to allow elongation and compression upon opening of said remote valve release. The remote valve release can be actuated by a push button or other suitable mechanism. In this way, with the remote valve release closed, the gas strut 150 can have a fixed length, thereby inhibiting rotation of the stem 22 about the rotational axis 28. When the remote valve release is opened, the gas strut 150 can be configured to elongate or compress in order to allow the stem 22 to rotate about the rotational axis 28. In some aspects, the gas strut 150 can be biased (e.g., spring-biased) toward the elongate position. In this way, the gas strut 150 can assist to lift the weight of the stem 22. Optionally, the remote valve 151 can be positioned for foot actuation (e.g., a foot pedal) or positioned for hand actuation (e.g., a thumb switch). An exemplary gas strut can be a remote-release gas spring, such as the remote-release gas spring manufactured as part number 9833T4 (MCMASTER-CARR). An exemplary valve can be a push-button release control, such as the push-button release control manufactured as part number 9684K13 (MCMASTER-CARR).

Figure 28A:
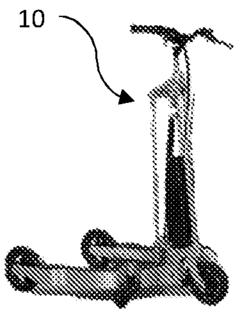
FIGS. 28A-28F illustrate perspective views of the exemplary mobility device of FIG. 25 in different configurations.
Figure 28B:
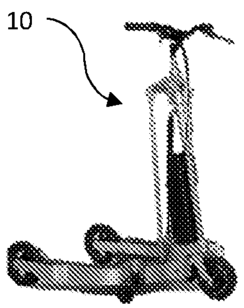
Figure 28C:
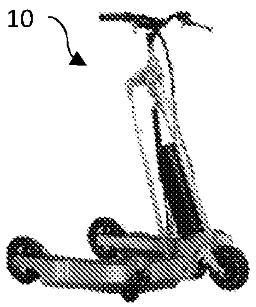
Figure 28D:
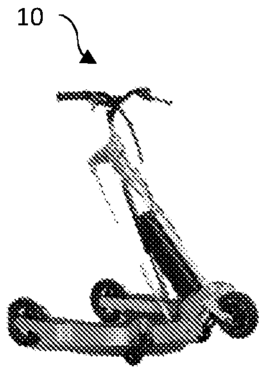
Figure 28E:
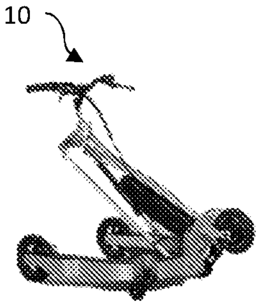
Figure 28F:
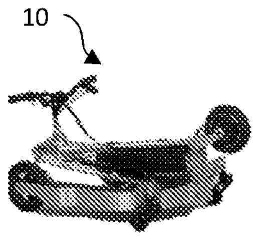

In further aspects, the locking mechanism for fixing the rotational position of the stem 22 relative to the frame 16 about the rotational axis 28 can comprise a release lever 152 (FIGS. 2-3) that is spring-biased into a locking position. The release lever can be receivable into a plurality of notches at different rotational positions of the stem. When the release lever is received within a notch of the plurality of notches, rotation of the stem 22 about the rotational axis 28 can be inhibited. Upon moving the release lever away from the notch against the spring bias, the stem 22 can be allowed to rotate about the rotational axis 28. Referring also to FIGS. 28A-28F, the stem 22 can be pivoted relative to the frame 16 to a plurality of positions. Optionally, the positions at which the stem 22 can be locked relative to the frame 16 can be discrete positions. In other aspects, the angle of the stem 22 relative to the frame 16 can be continuously adjustable. It is contemplated that, in some optional aspects, one or more of the scooter configuration, walker configuration, and stowed configuration can include multiple positions of the stem 22 relative to the frame 16. For example, in some aspects, FIGS. 28A-28C can be different scooter configurations; FIGS. 28D-28E can be different walker configurations; and FIG. 28F can show an exemplary stowed configuration.

Figure 13:
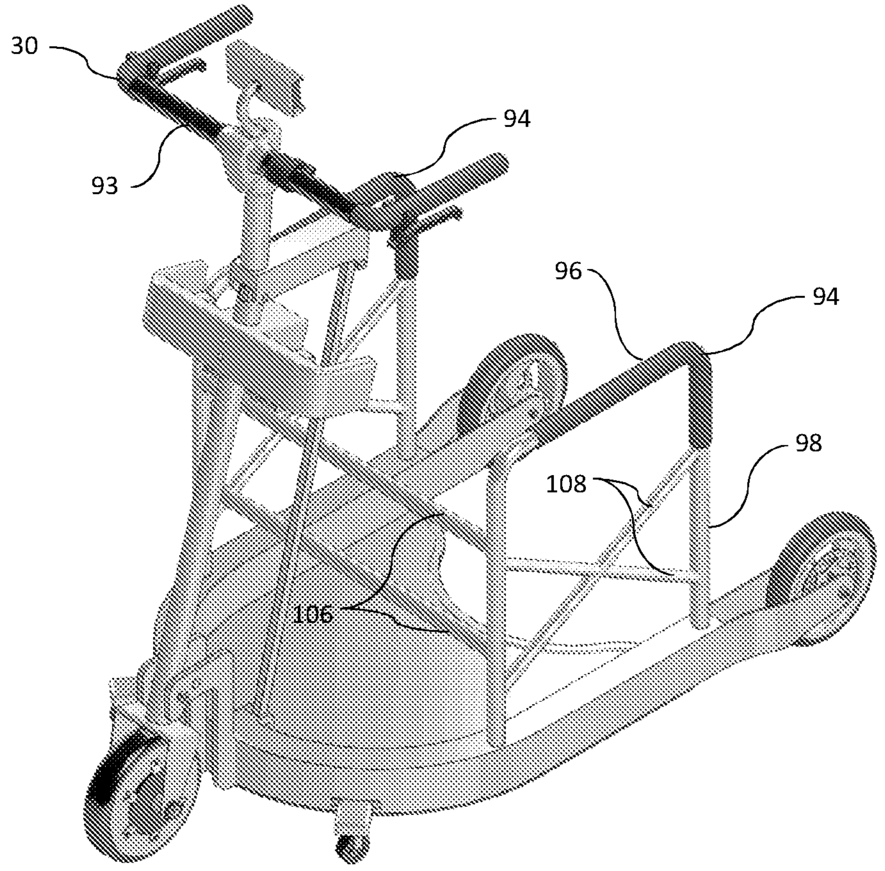
FIG. 13 is a perspective view of another exemplary mobility device in a scooter configuration.
Figure 14:
FIG. 14 is a side view of the mobility device of FIG. 13 in the scooter configuration.

Referring to FIGS. 12-13, in some aspects, the at least one handlebar 30 can define a first set of handles 93. The mobility device 10 can further comprise a second set of handles 94. The second set of handles 94 can comprise opposed handles that are fixedly coupled to the frame and spaced along the transverse axis. The second set of handles 94 can advantageously be used for support and for steering of the mobility device 10 with the mobility device in the walker configuration. The handles 94 can provide upright support to the user through the arms (e.g. for users with limited weight bearing on one leg). In some aspects, the handles 94 can comprise a single post that extends vertically from the frame 22. In further aspects, the handles 94 can be defined by opposed side rails 95. The opposed side rails 95 can optionally comprise horizontal portions 96 that extend longitudinally and vertical portions 98 that extend vertically from the frame and couple to the horizontal portions. Optionally, one or more transverse support members 106 can extend between and couple to the opposed side rails. Further, the opposed side rails 95 can comprise one or more diagonal support struts 108. Optionally, the handles 94 can be height-adjustable.

In some aspects, the opposed side rails 95 can define a standing frame that can bear at least a portion of the weight of the user. For example, the user can be attached to the side rails via a belt or harness. Such support can enable someone unable to bear weight on one leg or who has unsteadiness to comfortably ride the device while standing. Still further, the side rails can be used as tie-down attachment anchors to secure cargo.

Optionally, a respective hand brake 99 can be coupled to each of the opposed handles 94. Said hand brakes 99 can be in communication with at least one wheel of the pair of rear wheels 18 and configured as described with reference to the hand brakes 72 (e.g., as mechanical and/or electronic brakes).

Figure 18:
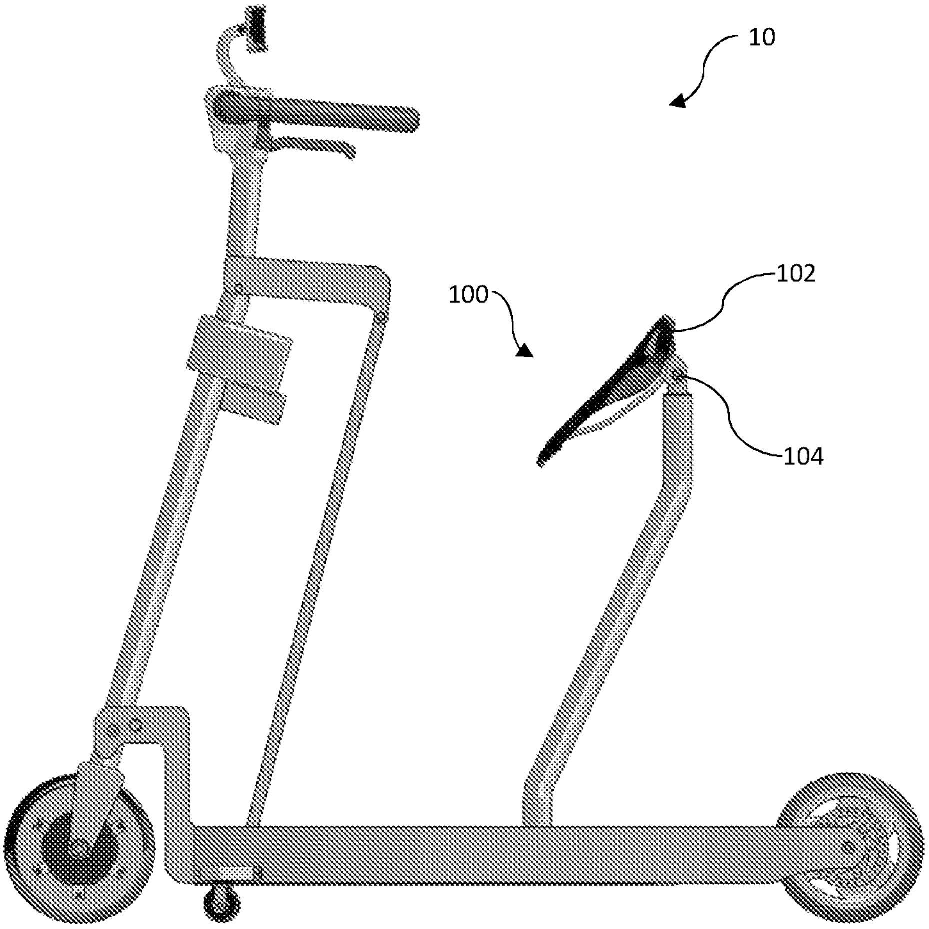
FIG. 18 is a side view of the mobility device of FIG. 17 in the scooter configuration.
Figure 19:
FIG. 19 is a side view of another exemplary mobility device in a scooter configuration. As shown, the mobility device can include side rails.
Figure 20:
FIG. 20 is a perspective view of the mobility device of FIG. 19 in the scooter configuration.

Referring to FIG. 18, the mobility device 10 can further comprise a support structure 100 that is coupled to the frame 16. In some aspects, the support structure 100 can comprise a seat 102 (e.g., a bike seat, with a narrow front and a wide back). The seat 102 can optionally be height adjustable (e.g., telescopically as is common for bicycle seats). Optionally, the seat 102 can be positioned beneath the groin of the user with the user in a near-standing position with her thighs parallel to the ground. In this way, the user can easily return to a standing position. The seat 102 can further be angularly adjustable about a pivotal axis 104 that is parallel to the transverse axis 14.

In further aspects, the mobility device 10 can comprise a support structure 100 that reduces the standing effort of the user and/or provides a surface against which the user can lean to balance. Thus, the support structure 100 can comprise a seat or a support bar/pads in front of the rider at thigh or waist level against which the user can selectively lean to reduce weight on the lower legs and to provide greater balance.

Figure 21:
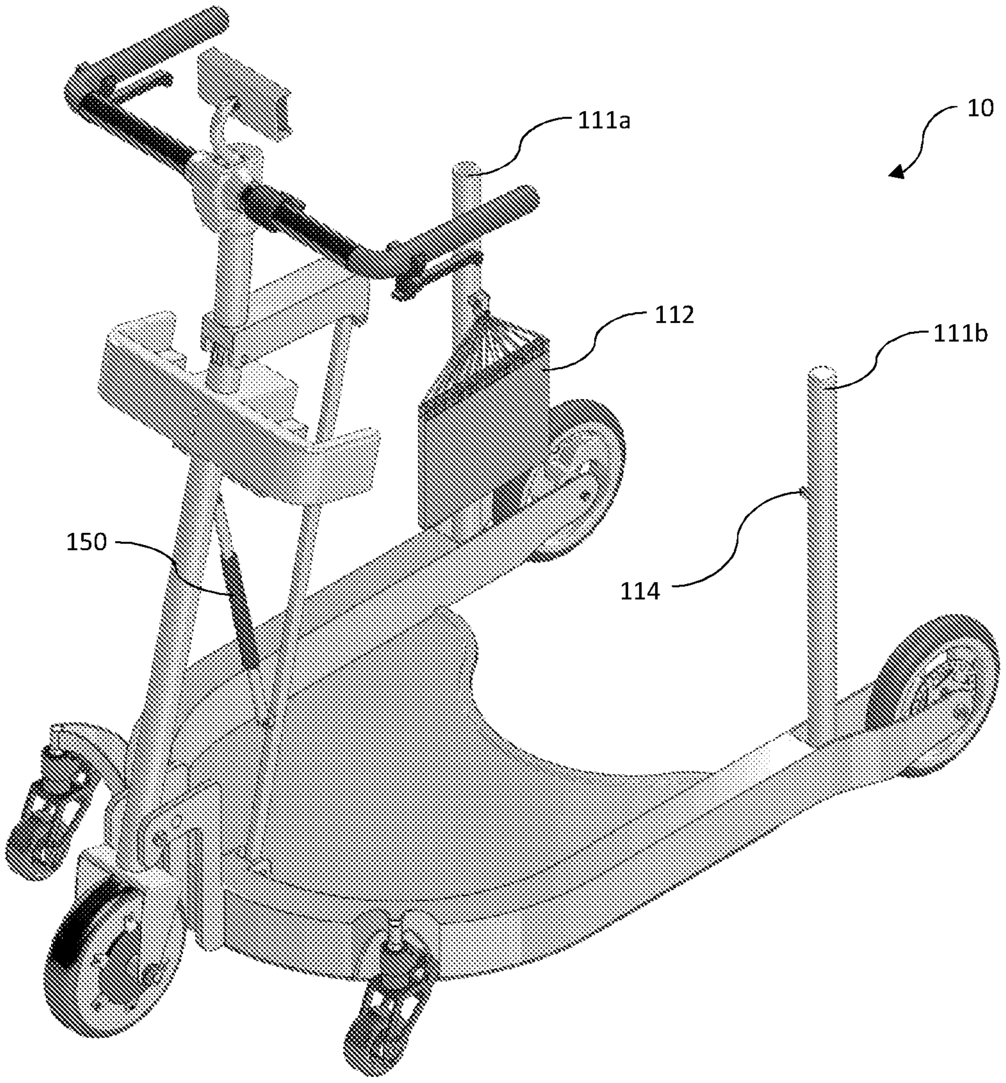
FIG. 21 is a perspective view of another exemplary mobility device in a scooter configuration. As shown, the mobility device can include a sitting platform, which can be positioned in a first configuration.
Figure 22:
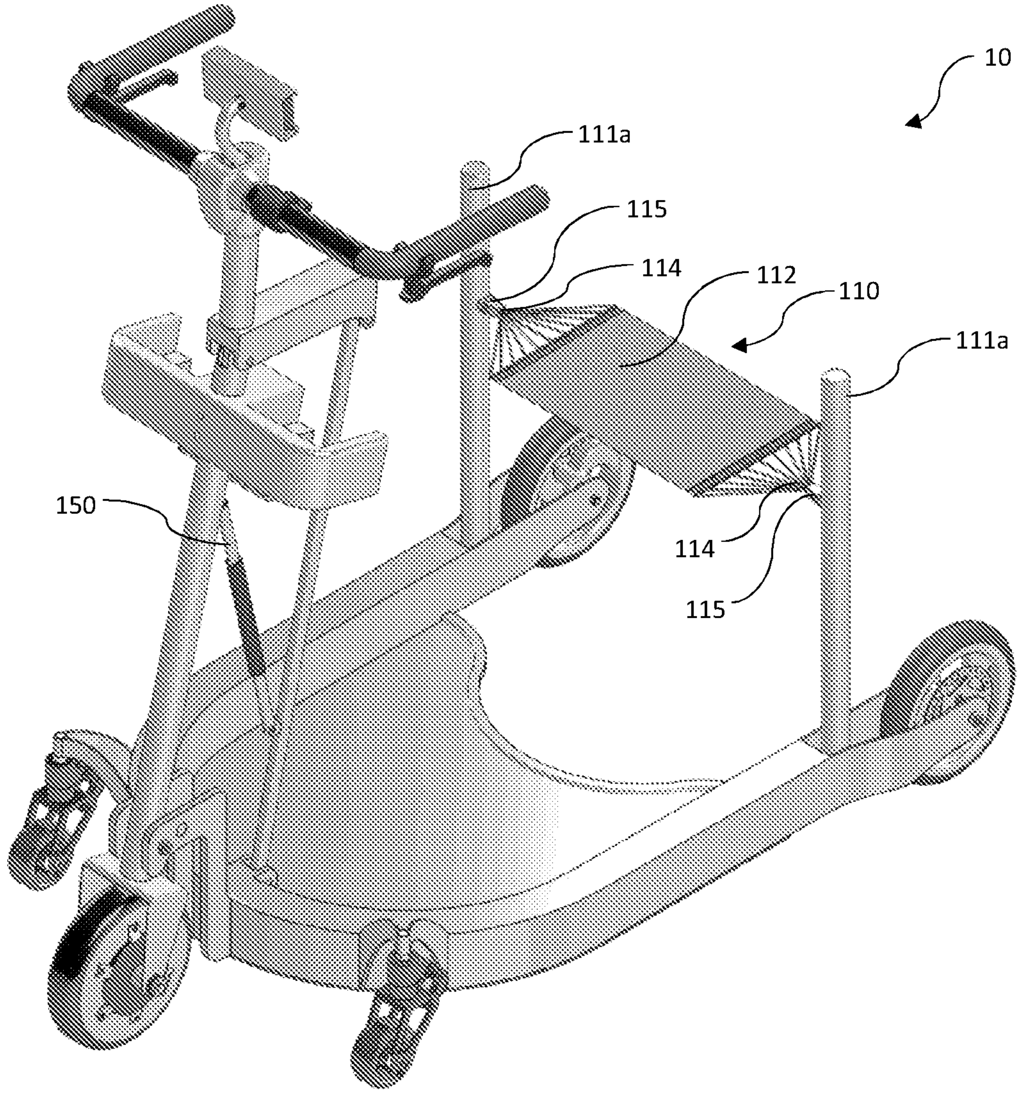
FIG. 22 is a perspective view of the mobility device of FIG. 21 in the scooter configuration, with the sitting platform in a second configuration.

Referring to FIGS. 21-22, the mobility device 10 can further comprise a sitting platform 110 that can be coupled to a first vertical support 111*a* (optionally, the post of one handle the opposed handles 94 (e.g., either the gripping portions of the handles or the vertically extending portions). The sitting platform 110 can be configured to releasably couple to a second vertical support 111*b* (optionally, the post of the other handle 94 of the opposed handles 94) in a horizontal position. Optionally, the sitting platform 110 can be a flexible platform (e.g., a hammock structure 112). The hammock structure can comprise a flexible elongate fabric having a sufficient length to extend between the handles 96 and a width (e.g., 2-16 inches) for comfortably receiving weight of the user. In various aspects, each of the handles 96 can comprise hooks 114 (or other fasteners) that can receive respective loops 115 (or other fastening elements) at opposing ends of the hammock structure 112. In further aspects, the sitting platform 110 can be rigid. For example, the sitting platform 110 can be pivotably coupled to the opposed handles 94.

Figure 8:
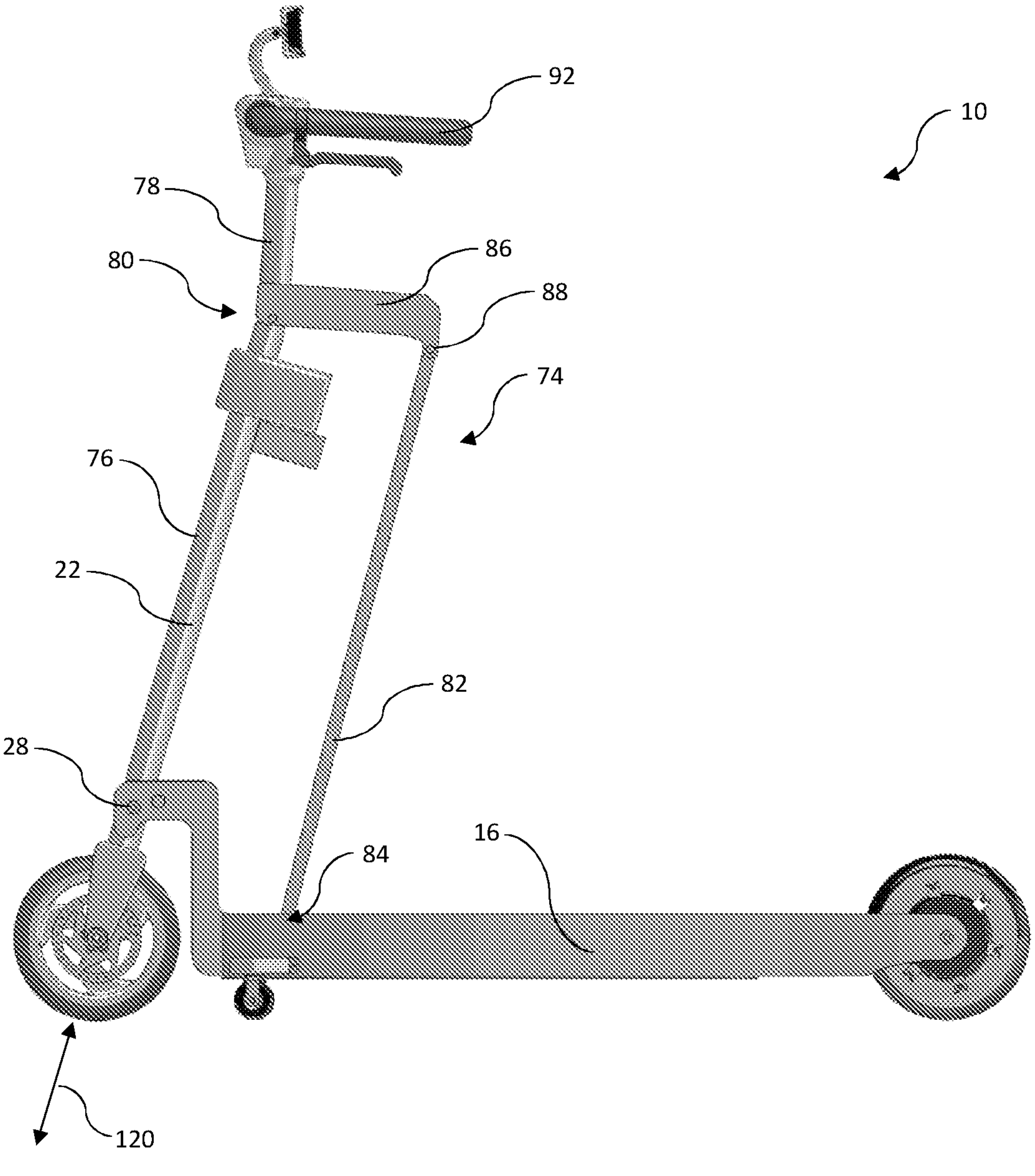
FIG. 8 is a side view of the mobility device of FIG. 7 in the scooter configuration.
Figure 9:
FIG. 9 is a perspective view of another exemplary mobility device in a walker configuration.
Figure 10:
FIG. 10 is a side view of the mobility device of FIG. 9 in the walker configuration.
Figure 11:
FIG. 11 is a perspective view of the mobility device of FIG. 9 in a scooter configuration.

When the stem 22 is in the first position, the stem can be configured to swivel about a swivel axis 120 (FIG. 8). The front wheel 32 can be coupled to the stem 22 so that swiveling of the stem about the swivel axis 120 causes corresponding swiveling of the front wheel about the swivel axis. In some aspects, when the stem 22 is in the second position (with the mobility device in the walker configuration), the stem can be locked to inhibit swiveling of the stem. The stem 22 can be locked, for example, with the handlebars 30 in a midline position, illustrated in FIG. 1. For example, the stem 22 can be locked (e.g., automatically locked) to inhibit swiveling of the stem when the stem reaches a predetermined angle relative to the deck 44 (e.g., 75 degrees or less, 60 degrees or less, or 45 degrees or less). In exemplary aspects, the stem 22 can be locked about the swivel axis 120 by a clamp, a locking pin, or other structure that selectively inhibits rotation of the stem relative to the frame.

Figure 5:
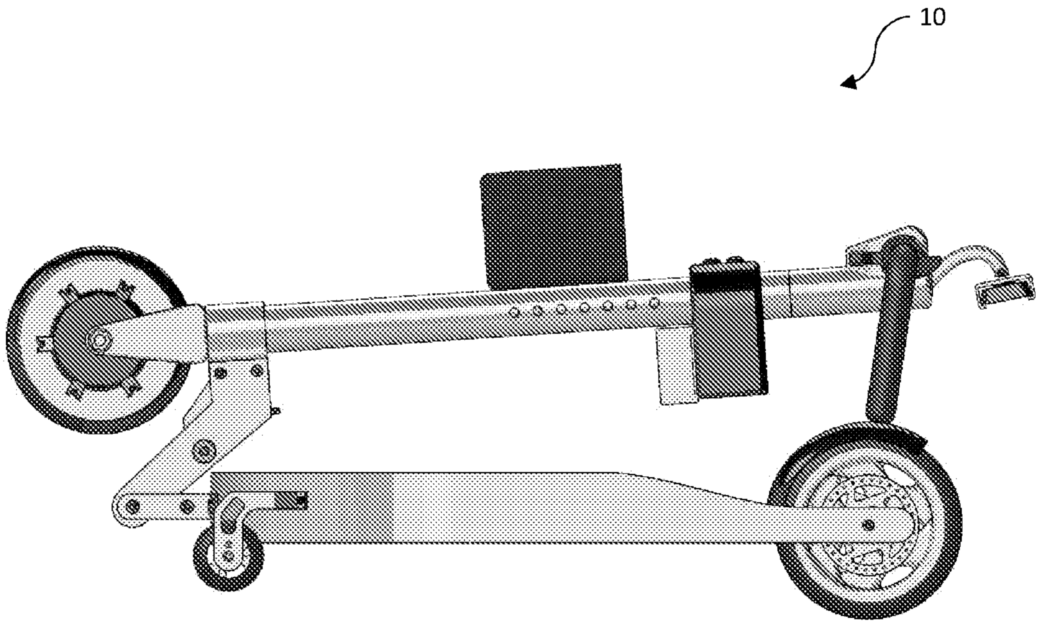
FIG. 5 is a side view of the mobility device of FIG. 1 in a stowed configuration.
Figure 6:
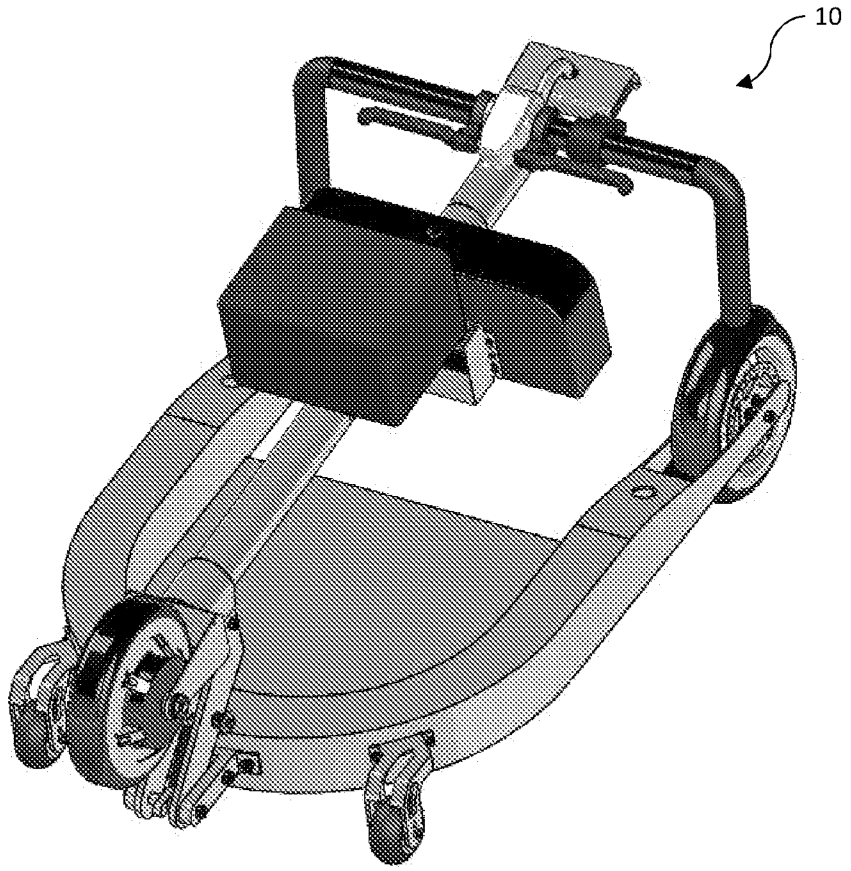
FIG. 6 is a perspective view of the mobility device of FIG. 1 in the stowed configuration.

In some aspects, the stem 22 can be configured to be positioned in a third (stowed) position (FIGS. 5-6) that is rotationally offset from the first and second positions. In the third position, the mobility device can have a height of no greater than 10 inches. Optionally, in the third (stowed) position, the stem 22 can be parallel to, or generally parallel to, the deck, or within 10 degrees or within 20 degrees of parallel to the deck.

In still further aspects, the stem 22 can be configured to be positioned in a plurality of different positions between the first position and the third position. In this way, the height of the handlebars and/or the spacing of the handlebars along the longitudinal axis 12 can be selected based on user preference.

In some aspects, the mobility device 10 can comprise at least one anchor 126 that is configured to secure a tie down for securing cargo to the mobility device. The anchor 126 can be, for example, a loop or hook that can receive a tie down strap.

In some aspects, the mobility device 10 can comprise one or more of a horn, a light, a phone holder, a basket, a tray, an oxygen tank bracket, a water bottle bracket, an umbrella holder, or a child seat.

Figure 2:
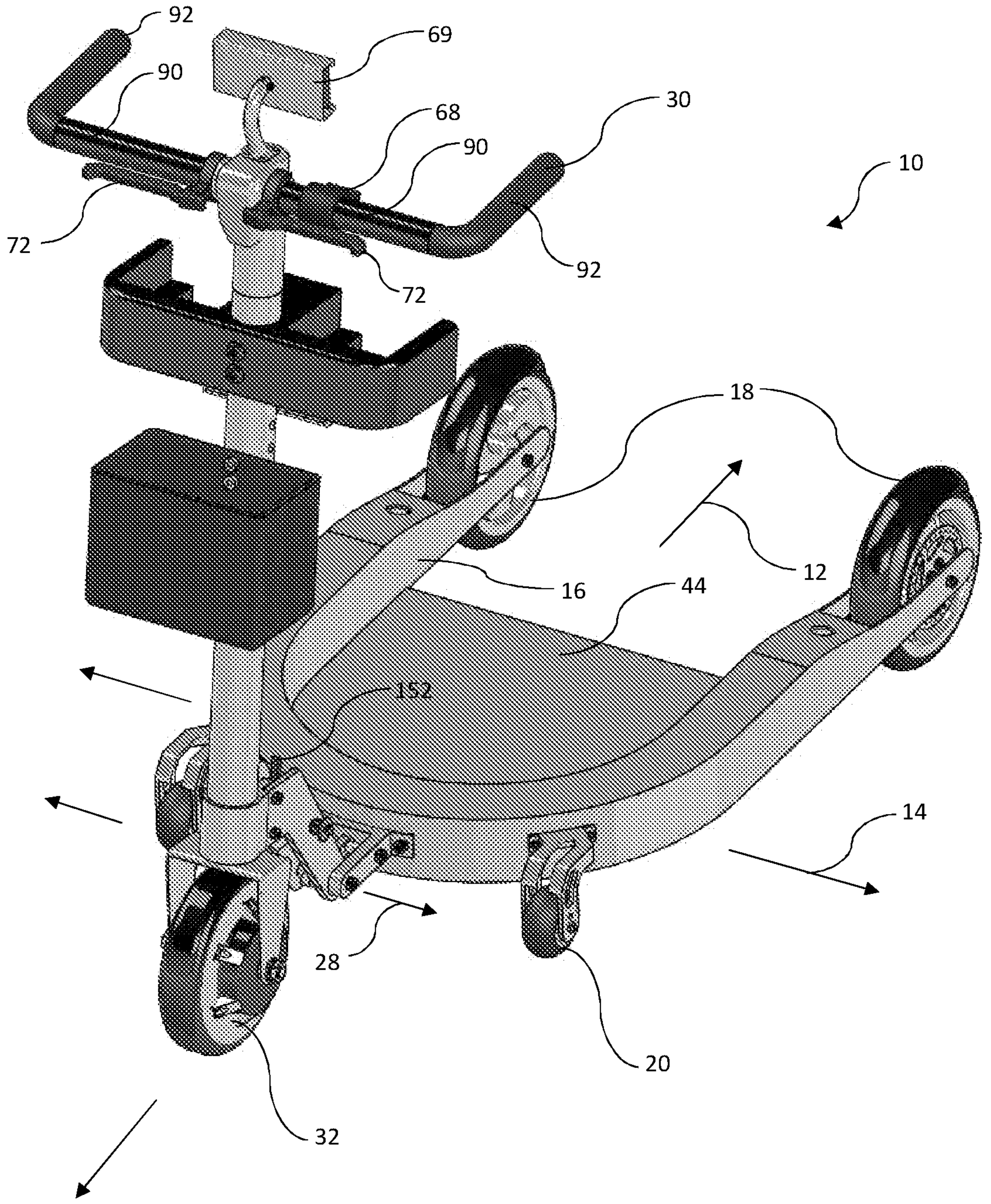
FIG. 2 is a perspective view of the mobility device of FIG. 1 in the scooter configuration.
Figure 3:
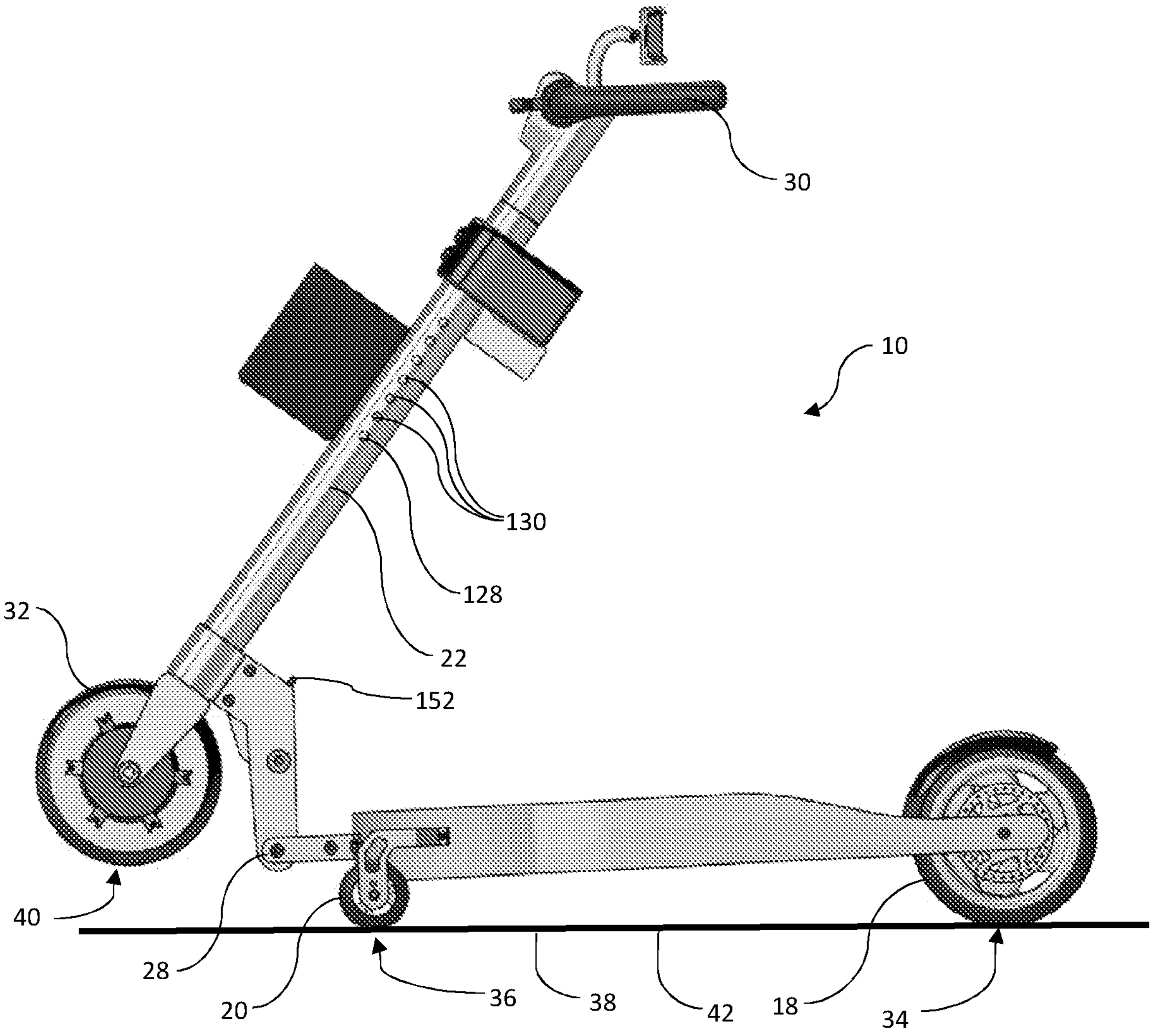
FIG. 3 is a side view of the mobility device of FIG. 1 in a walker configuration.
Figure 4:
FIG. 4 is a perspective view of the mobility device of FIG. 1 in the walker configuration.

In some aspects, the mobility device 10 can comprise at least one of a geolocation device 136 or a geofencing device 138. In exemplary aspects, the geolocation device 136 or the geofencing device 138 can be embedded within or positioned adjacent to the display 69 (FIG. 2).

In some aspects, the mobility device 10 can comprise one or more sensors 140 to warn a vision impaired user of obstructions. For example, the mobility device 10 can comprise an alarm and at least one proximity sensor in communication with the alarm 142. The at least one proximity sensor 140 can be configured to detect proximity of an obstacle relative to the mobility device. The alarm 142 can be configured to activate upon the at least one proximity sensor detecting the proximity of the obstacle. The alarm 142 can be, for example, an audible alarm (e.g., a speaker) or a visual alarm (e.g., an indication on the display or a separate alarm light).

In some optional aspects, the stem 22 can be configured to have an adjustable length to allow the handlebars 30 to be at various heights from the ground. For example, the stem 22 can comprise an inner tube and an outer tube, wherein the inner tube is telescopically movable relative to the outer tube. The inner tube can be fixed relative to the outer tube via a locking structure, such as a clamp or a spring detent 128 that is receivable into a plurality of openings 130 (FIG. 3) along the stem.

Figure 15:
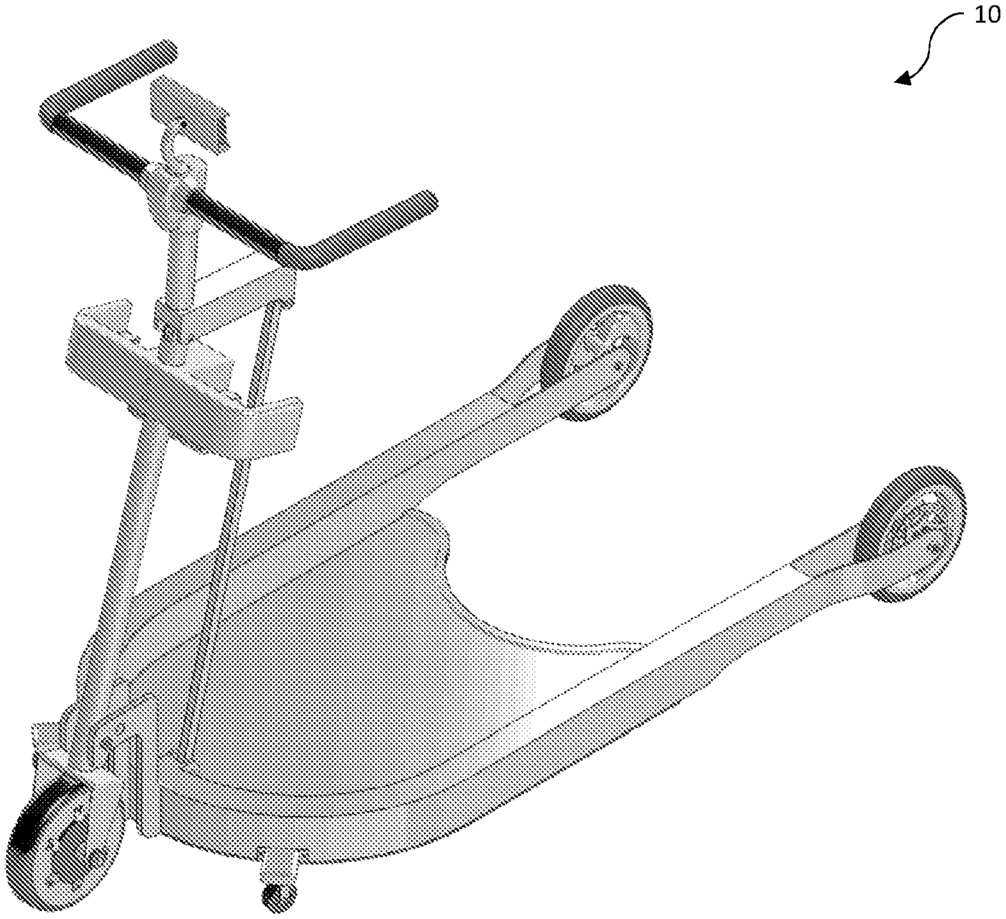
FIG. 15 is a perspective view of another exemplary mobility device in a scooter configuration. As shown, the mobility device can include an elongated deck.
Figure 16:
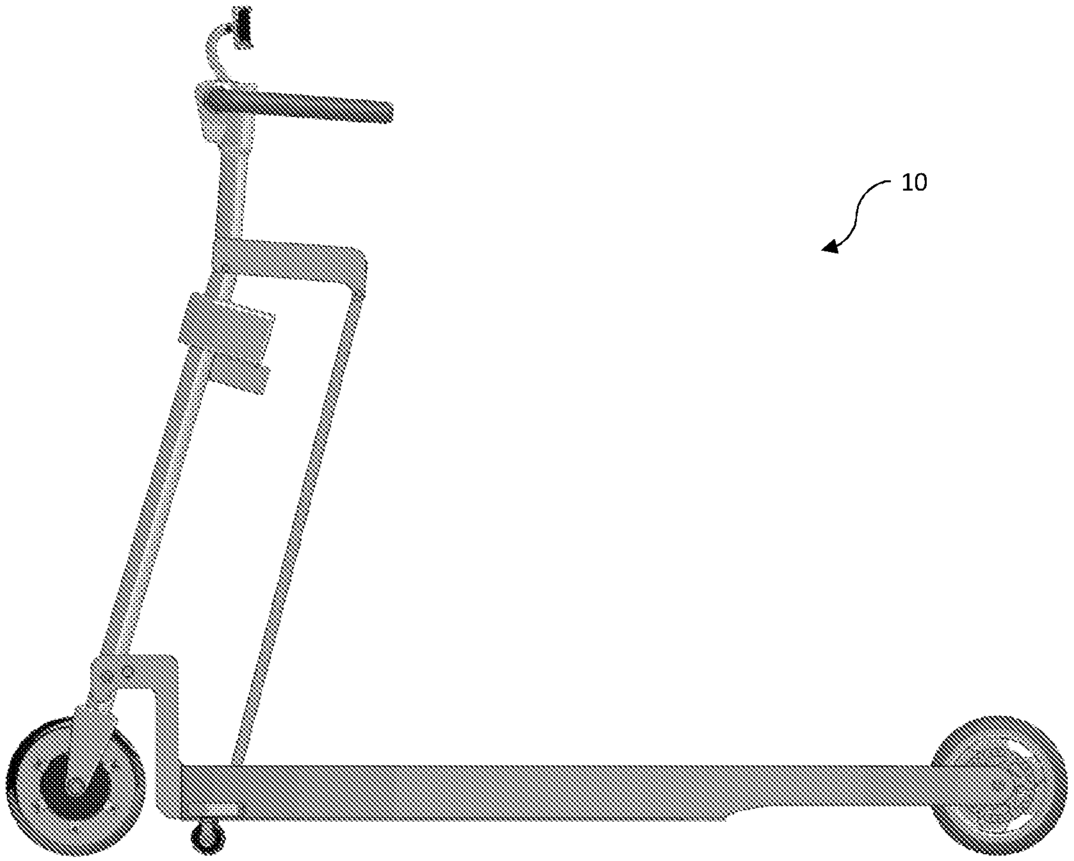
FIG. 16 is a side view of the mobility device of FIG. 15 in the scooter configuration.
Figure 17:
FIG. 17 is a perspective view of another exemplary mobility device in a scooter configuration. As shown, the mobility device can include a seat as a support structure.

Referring to FIGS. 15-16, the frame 16 and the deck 44 can be elongated along the longitudinal axis 12 in order to enable two users to ride simultaneously and/or to allow additional cargo space. For example, in exemplary, optional aspects, the deck 44 can be elongated by about twelve inches from a first length configured for supporting a single user (e.g., a length ranging from about 20 inches to about 30 inches or being about 25 inches) to a second length configured for supporting two users (e.g., a length ranging from about 30 inches to about 45 inches or being about 37 inches).

In some aspects, the mobility device 10 can have electronic security that requires entry of a specific code. In some aspects, the mobility device 10 can detect a fob held by the user via a wireless connection. In some aspects, operation of the mobility device 10 can require wireless connection to a cellular phone that has a security application and code specific for the device in order to inhibit unauthorized use. In some aspects, the electronic security can be configured to affect the power operation only or to actuate/deactuate a rear wheel lock, thereby preventing even manual use.

In some aspects, the mobility device 10 can comprise an electronic control with a remote auxiliary control device or wireless application to allow a caregiver to stop the device (e.g., in case of the mobility device traveling too far from caregiver). In another embodiment, the mobility device 10 can comprise a remote control to allow the user to start, initiate the motor, and steer the device.

Optionally, the stem 22 and the frame 16 can be releasably coupled for easy lifting in storage. In further aspects, the stem 22 and the frame 16 can be non-releasably coupled.

In some aspects, the rear wheels 18 are of a fixed size. In further aspects, the rear wheels 18 can be easily exchanged for other widths and tread patterns for better performance on specific types of surfaces (e.g. on grass vs. pavement).

In some aspects, the mobility device 10 can be sized and otherwise suited for adults (e.g. 5-7 feet tall). In further aspects, the mobility device 10 can be sized and otherwise suited for children or small adults (e.g. 3-5 feet tall).

Optionally, the mobility device 10 can comprise a handle (not shown) for lifting the mobility device (e.g., for carrying upstairs). In further aspects, the handle can enable lifting the mobility device for carrying on the rear wheels. Optionally, the handle can be positioned on the front of the stem 22.

In some aspects, the mobility device 10 can have a turning radius of about 1 meter or less, allowing for a U-turn in a 2-meter-wide hallway. In some aspects, the mobility device 10 can climb at least an 8% grade hill. The brake can be able to stop the mobility device from full speed within about 0.6 meters. The mobility device 10 can have a weight of less than 15 kg, or about 11 kg or less. The mobility device 10 can have a width of less than 70 cm (e.g., less than 68 cm or less than 65 cm) in order to fit through doorways.

Figure 29:
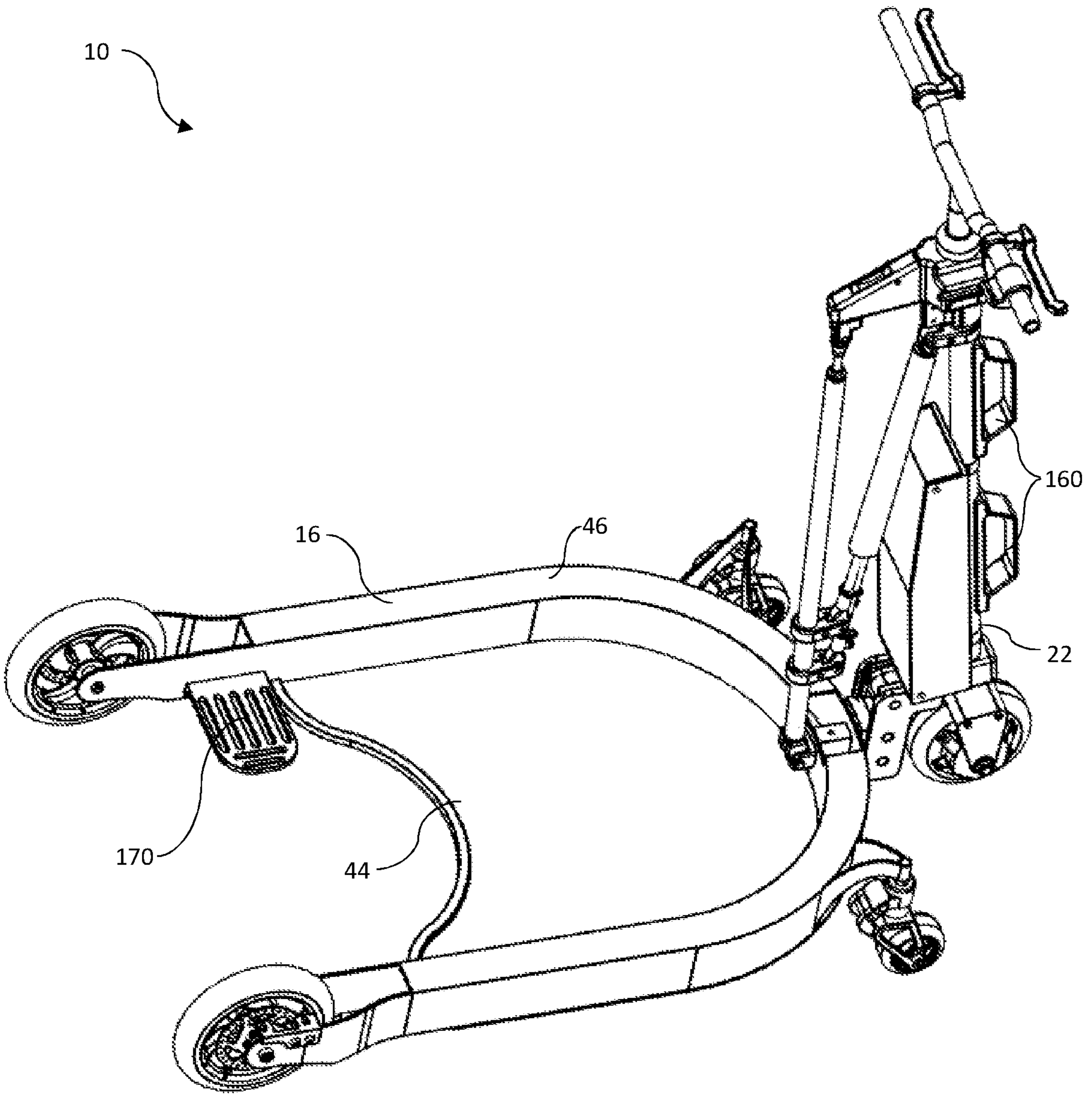
FIG. 29 is a perspective view of an exemplary mobility device as disclosed herein.

Referring to FIG. 29, in some aspects, the mobility device 10 can comprise at least one lifting handle 160. For example, the mobility device can comprise a pair of lifting handles that couple to the stem 22. The lifting handle(s) 160 can be positioned on a front of the stem 22.

In some aspects, mobility device 10 can comprise a footplate 170 at or proximate to the rear of the frame 16. The footplate 170 can extend inwardly from a side (e.g., a left side) of the support (e.g., U-shaped support) 46. In some aspects, the footplate 170 can be positioned rearward of the deck 44. Optionally, the mobility device can have only one footplate. Alternatively, the mobility device can include two or more footplates (for example, two footplates positioned on opposing sides of the support). The footplate 170 can have a hole pattern extending therethrough. The hole pattern can reduce weight and improve friction between the plate and a user's foot. The footplate 170 can be used to assist in overcoming a curb. For example, a user can place a foot on the footplate 170 and pull on the handlebars to elevate the front wheel, with the footplate being used to hold the scooter as leverage is applied to the stem.

In some optional aspects, the mobility device 10 can comprise an interlock 180 that inhibits activation of the motor when the stem 22 is in a particular position. For example, the mobility device 10 can comprise a switch that closes upon the stem 22 reaching a particular position relative to the frame 16 (e.g., when the mobility device is in the scooter configuration). When the switch is closed, the motor can be activated. When the switch is open, activation of the motor can be inhibited. In this way, inadvertent operation of the motor can be avoided.

EXEMPLARY ASPECTS

In view of the described products, systems, and methods and variations thereof, herein below are described certain more particularly described aspects of the invention. These particularly recited aspects should not however be interpreted to have any limiting effect on any different claims containing different or more general teachings described herein, or that the "particular" aspects are somehow limited in some way other than the inherent meanings of the language literally used therein.

Aspect 1: A mobility device having a longitudinal axis and comprising:

- a frame;
- a pair of rear wheels coupled to the frame, wherein the rear wheels are spaced along a transverse axis that is perpendicular to the longitudinal axis;
- at least one caster coupled to the frame, wherein the at least one caster is positioned forwardly of the pair of rear wheels along the longitudinal axis;
- a stem coupled to the frame, wherein the stem has a first end portion and a second end portion, wherein the stem is configured to be selectively positioned in at least a first position and a second position, wherein the second position is rotationally offset from the first position about a rotational axis,
- at least one handle bar coupled to the stem at the first end portion of the stem; and
- at least one front wheel coupled to the second end portion of the stem,
- wherein a lowest portion of the pair of rear wheels and a lowest portion of the at least one caster define a plane, wherein:
  - when the stem is in the first position, a lowest portion of the at least one front wheel is below the plane, and
  - when the stem is in the second position, the lowest portion of the at least one front wheel is above the plane.

Aspect 2: The mobility device of aspect 1, further comprising a deck.

Aspect 3: The mobility device of aspect 2, wherein the frame comprises a U-shaped support, wherein the U-shaped support comprises opposing side portions that extend along the longitudinal axis, wherein the deck extends between the opposing side portions of the U-shaped support.

Aspect 4: The mobility device of aspect 2 or aspect 3, wherein the deck defines a rear edge having opposed side portions and a center portion positioned between the opposed side portions along the transverse axis, wherein the center portion of the rear edge is spaced from the side portions of the rear edge in a forward direction along the longitudinal axis.

Aspect 5: The mobility device of any one of aspects 2-4, wherein at least a portion of the deck is configured to move relative to the frame from a use configuration to a stowed configuration.

Aspect 6: The mobility device of aspect 5, wherein the deck comprises a first segment that is pivotably coupled to the frame and a second segment that is pivotably coupled to the first segment.

Aspect 7: The mobility device of aspect 6, further comprising a third segment that is fixedly coupled to the frame.

Aspect 8: The mobility device of any one of the preceding aspects, further comprising a motor that is operatively coupled to the at least one front wheel or at least one of the pair of rear wheels.

Aspect 9: The mobility device of aspect 8, wherein the motor is operatively coupled to the at least one of the pair of rear wheels.

Aspect 10: The mobility device of aspect 8, wherein the motor is operatively coupled to the at least one front wheel.

Aspect 11: The mobility device of any one of aspects 8-10, further comprising a throttle in communication with the motor.

Aspect 12: The mobility device of any one of the preceding aspects, further comprising at least one hand brake that is in communication with at least one wheel of the pair of rear wheels.

Aspect 13: The mobility device of aspect 12, wherein the at least one hand brake comprises a pair of hand brakes on opposing sides of the at least one handle bar.

Aspect 14: The mobility device of any one of the preceding aspects, wherein the mobility device comprises a four-bar linkage, wherein the stem comprises:

a lower portion that defines a portion of the four-bar linkage;

an upper portion; and a universal joint that couples the upper portion to the lower portion.

Aspect 15: The mobility device of aspect 14, wherein the four-bar linkage further comprises a first bar that is pivotably coupled to the frame at a first pivot point and a second bar that is pivotably coupled to the first bar at a second pivot point and is coupled to the stem, wherein the upper portion of the stem extends from the second bar at a fixed angle.

Aspect 16: The mobility device of any one of the preceding aspects, further comprising a seat that is coupled to the frame.

Aspect 17: The mobility device of any one of the preceding aspects, wherein the at least one handle bar comprises a transverse portion that extends radially from the stem and a distal end portion that extends at a predetermined angle from the transverse portion.

Aspect 18: The mobility device of any one of the preceding aspects, wherein the mobility device comprises a first set of handles defined by the at least one handlebar, wherein the mobility device further comprises a second set of handles, wherein the second set of handles comprise opposed handles that are fixedly coupled to the frame and spaced along the transverse axis.

Aspect 19: The mobility device of aspect 18, further comprising a respective hand brake that is coupled to each of the opposed handles.

Aspect 20: The mobility device of aspect 18 or aspect 19, wherein the handles are defined by opposed side rails.

Aspect 21: The mobility device of any one of aspects 18-20, further comprising:

first and second vertical supports; and a sitting platform that is coupled to the first vertical support, wherein the sitting platform is configured to releasably couple to the second vertical support in a horizontal position.

Aspect 22: The mobility device of any one of the preceding aspects, wherein when the stem is in the first position, the stem is configured to swivel about a swivel axis, and wherein the at least one front wheel is coupled to the stem so that swiveling of the stem about the swivel axis causes corresponding swiveling of the at least one front wheel about the swivel axis.

Aspect 23: The mobility device of any one of the preceding aspects, wherein the stem is further configured to be selectively positioned in a third position that is rotationally offset from each of the first and second positions about the rotational axis.

Aspect 24: The mobility device of any one of the preceding aspects, further comprising a controller in communication with the motor, wherein the controller is configured to limit the speed of the motor.

Aspect 25: The mobility device of any one of the preceding aspects, further comprising at least one anchor that is configured to secure a tie down for securing cargo to the mobility device.

Aspect 26: The mobility device of any one of the preceding aspects, further comprising a battery pack, wherein the battery pack is configured for removal and replacement.

Aspect 27: The mobility device of any one of the preceding aspects, further comprising at least one accessory, wherein the at least one accessory comprises a horn, a light, a phone holder, a basket, a tray, an oxygen tank bracket, a water bottle bracket, an umbrella holder, a child seat, or combinations thereof.

Aspect 28: The mobility device of any one of the preceding aspects, further comprising at least one of a geolocation device or a geofencing device.

Aspect 29: The mobility device of any one of the preceding aspects, further comprising an alarm and at least one proximity sensor in communication with the alarm, wherein the at least one proximity sensor is configured to detect proximity of an obstacle relative to the mobility device, wherein the alarm is configured to activate upon the at least one proximity sensor detecting the proximity of the obstacle.

Aspect 30: The mobility device of any one of the preceding aspects, wherein the stem is configured to have an adjustable length.

Aspect 31: The mobility device of aspect 22, wherein the mobility device comprises a locking structure that is configured to inhibit swiveling of the stem about the swivel axis when the stem is in the second position.

Aspect 32: The mobility device of aspect 15, further comprising:

a gas strut that extends between and couples to each of the lower portion of the stem and the first bar of the four-bar linkage; and a valve release in communication with the gas strut, wherein the valve release is movable about between a closed position and an open position, wherein the gas strut is configured to inhibit movement of the strut when the valve release is in the closed position.

Aspect 33: The mobility device of aspect 32, wherein the valve release is coupled to the stem.

Aspect 34: The mobility device of aspect 32 or aspect 33, wherein the gas strut is spring-biased toward an extended configuration.

Although several embodiments of the invention have been disclosed in the foregoing specification, it is understood by those skilled in the art that many modifications and other embodiments of the invention will come to mind to which the invention pertains, having the benefit of the teaching presented in the foregoing description and associated drawings. It is thus understood that the invention is not limited to the specific embodiments disclosed herein, and that many modifications and other embodiments are intended to be included within the scope of the appended aspects. Moreover, although specific terms are employed herein, as well as in the aspects which follow, they are used only in a generic and descriptive sense, and not for the purposes of limiting the described invention, nor the aspects which follow.

What is claimed is:

1. A mobility device having a longitudinal axis and comprising:

a frame;

a pair of rear wheels coupled to the frame, wherein the rear wheels are spaced along a transverse axis that is perpendicular to the longitudinal axis;

at least one caster coupled to the frame, wherein the at least one caster is positioned forwardly of the pair of rear wheels along the longitudinal axis;

a stem coupled to the frame, wherein the stem has a first end portion and a second end portion, wherein the stem is configured to be selectively locked in at least a first position corresponding to a scooter configuration of the mobility device, a second position corresponding to a walker configuration of the mobility device, and a third position corresponding to a stowed position of the mobility device, wherein the second position is rotationally offset from the first position about a rotational axis, and wherein the third position is rotationally offset from each of the first and second positions about the rotational axis, at least one handle bar coupled to the stem at the first end portion of the stem; and at least one front wheel coupled to the second end portion of the stem, wherein a lowest portion of the pair of rear wheels and a lowest portion of the at least one caster define a plane, wherein:

when the stem is in the first position corresponding to the scooter configuration of the mobility device, a lowest portion of the at least one front wheel is below the plane, and when the stem is in the second position corresponding to the walker configuration of the mobility device, the lowest portion of the at least one front wheel is above the plane.

2. The mobility device of claim 1, further comprising a deck.

3. The mobility device of claim 2, wherein the frame comprises a U-shaped support, wherein the U-shaped support comprises opposing side portions that extend along the longitudinal axis, wherein the deck extends between the opposing side portions of the U-shaped support, wherein the deck has a rear edge, wherein the pair of rear wheels are coupled to the U-shaped support, wherein the U-shaped support and the rear edge of the deck define a space configured to receive feet of a user when the mobility device is in the walker configuration, and wherein said space is between the rear wheels.

4. The mobility device of claim 2, wherein the deck defines a rear edge having opposed side portions and a center portion positioned between the opposed side portions along the transverse axis, wherein the center portion of the rear edge is spaced from the side portions of the rear edge in a forward direction along the longitudinal axis.

5. The mobility device of claim 2, wherein at least a portion of the deck is configured to move relative to the frame from a use configuration to a stowed configuration.

6. The mobility device of claim 5, wherein the deck comprises a first segment that is pivotably coupled to the frame and a second segment that is pivotably coupled to the first segment.

7. The mobility device of claim 6, further comprising a third segment that is fixedly coupled to the frame.

8. The mobility device of claim 1, further comprising a motor that is operatively coupled to the at least one front wheel or at least one of the pair of rear wheels.

9. The mobility device of claim 8, wherein the motor is operatively coupled to the at least one of the pair of rear wheels.

10. The mobility device of claim 8, wherein the motor is operatively coupled to the at least one front wheel.

11. The mobility device of claim 8, further comprising a throttle in communication with the motor.

12. The mobility device of claim 1, further comprising at least one hand brake that is in communication with at least one wheel of the pair of rear wheels.

13. The mobility device of claim 12, wherein the at least one hand brake comprises a pair of hand brakes on opposing sides of the at least one handle bar.

14. The mobility device of claim 1, wherein the at least one handle bar comprises a transverse portion that extends radially from the stem and a distal end portion that extends at a predetermined angle from the transverse portion.

15. The mobility device of claim 1, wherein the mobility device comprises a first set of handles defined by the at least one handle bar, wherein the mobility device further comprises a second set of handles, wherein the second set of handles comprise opposed handles that are fixedly coupled to the frame and spaced along the transverse axis.

16. The mobility device of claim 15, further comprising:

first and second vertical supports; and a sitting platform that is coupled to the first vertical support, wherein the sitting platform is configured to releasably couple to the second vertical support in a horizontal position.

17. The mobility device of claim 1, wherein when the stem is in the first position, the stem is configured to swivel about a swivel axis, and wherein the at least one front wheel is coupled to the stem so that swiveling of the stem about the swivel axis causes corresponding swiveling of the at least one front wheel about the swivel axis.

18. The mobility device of claim 1, further comprising at least one of a geolocation device or a geofencing device.

19. The mobility device of claim 1, further comprising an alarm and at least one proximity sensor in communication with the alarm, wherein the at least one proximity sensor is configured to detect proximity of an obstacle relative to the mobility device, wherein the alarm is configured to activate upon the at least one proximity sensor detecting the proximity of the obstacle.

20. The mobility device of claim 1, wherein the stem is configured to have an adjustable length.

21. The mobility device of claim 1, wherein the at least one handle bar is configured to be pivoted relative to the stem and locked in a plurality of pivoted positions relative to the stem.

22. A mobility device having a longitudinal axis and comprising:

a frame;

a pair of rear wheels coupled to the frame, wherein the rear wheels are spaced along a transverse axis that is perpendicular to the longitudinal axis;

at least one caster coupled to the frame, wherein the at least one caster is positioned forwardly of the pair of rear wheels along the longitudinal axis;

a stem coupled to the frame, wherein the stem has a first end portion and a second end portion, wherein the stem is configured to be selectively positioned in at least a first position and a second position, wherein the second position is rotationally offset from the first position about a rotational axis, at least one handle bar coupled to the stem at the first end portion of the stem; and at least one front wheel coupled to the second end portion of the stem, wherein a lowest portion of the pair of rear wheels and a lowest portion of the at least one caster define a plane, wherein:

when the stem is in the first position, a lowest portion of the at least one front wheel is below the plane, and when the stem is in the second position, the lowest portion of the at least one front wheel is above the plane, wherein the mobility device further comprises a four-bar linkage, wherein the stem comprises:

a lower portion that defines a portion of the four-bar linkage;

an upper portion; and a universal joint that couples the upper portion to the lower portion.

23. The mobility device of claim 22, wherein the four-bar linkage comprises a first bar that is pivotably coupled to the frame at a first pivot point and a second bar that is pivotably coupled to the first bar at a second pivot point, wherein the second bar is coupled to the stem, and wherein an upper portion of the stem extends from the second bar at a fixed angle such that the at least one handle bar remains rotationally fixed as the stem pivots between the first and second positions.

24. The mobility device of claim 23, further comprising:

a gas strut that extends between and couples to each of the lower portion of the stem and the first bar of the four-bar linkage; and a valve release in communication with the gas strut, wherein the valve release is movable about and between a closed position and an open position, wherein the gas strut is configured to inhibit movement of the stem when the valve release is in the closed position.

* * * * *